United States Patent
Owens et al.

(10) Patent No.: US 12,458,037 B2
(45) Date of Patent: Nov. 4, 2025

(54) METHOD AND APPARATUS FOR FREEZING CONSUMABLE PRODUCTS

(71) Applicant: VITRAFY LIFE SCIENCES LIMITED, Hobart (AU)

(72) Inventors: Brent Owens, Hobart (AU); Sean Cameron, Hobart (AU); Brian Taylor, Hobart (AU)

(73) Assignee: VITRAFY LIFE SCIENCES PTY LTD, Hobart (AU)

( * ) Notice: Subject to any disclaimer, the term of this patent is extended or adjusted under 35 U.S.C. 154(b) by 41 days.

(21) Appl. No.: 17/917,478

(22) PCT Filed: Apr. 6, 2021

(86) PCT No.: PCT/AU2021/050313
§ 371 (c)(1),
(2) Date: Oct. 6, 2022

(87) PCT Pub. No.: WO2021/203163
PCT Pub. Date: Oct. 14, 2021

(65) Prior Publication Data
US 2023/0157328 A1    May 25, 2023

(30) Foreign Application Priority Data
Apr. 8, 2020    (AU) ................................ 2020901100

(51) Int. Cl.
*A23B 2/80*    (2025.01)
*A23B 4/06*    (2006.01)
(Continued)

(52) U.S. Cl.
CPC ............ *A23B 2/8055* (2025.01); *A23B 4/068* (2013.01); *A23B 11/1455* (2025.01);
(Continued)

(58) Field of Classification Search
CPC ......... A23L 3/364; A23B 4/068; A23C 3/055; F25D 17/02; F25D 25/005;
(Continued)

(56) References Cited

U.S. PATENT DOCUMENTS 1,640,252 A     8/1927 Rizer
2,632,453 A *   3/1953 Friedman ............... A23G 9/083
                                                            134/107

(Continued)

FOREIGN PATENT DOCUMENTS

CN    103340467 A      10/2013
CN    207519035 U  *    6/2018 ............... G06F 1/20
(Continued)

OTHER PUBLICATIONS

International Search Report and Written Opinion from International Application No. PCT/AU2021/050313 dated Jul. 2, 2021.
(Continued)

*Primary Examiner* — Kun Kai Ma
(74) *Attorney, Agent, or Firm* — Lando & Anastasi, LLP

(57) ABSTRACT

An apparatus for preserving consumable products comprising an inner housing arranged within an outer insulated housing, wherein walls of the inner housing define a compartment for receiving consumable products, said walls comprising an inlet wall for inflow of a heat exchange fluid into the compartment, an opposed outlet wall for outflow of a heat exchange fluid out of the compartment, side walls and a base, the side walls and base adjoining the inlet wall to the outlet wall, wherein the inlet wall and outlet wall each include a series of apertures to accommodate a continuous heat exchange fluid flow through the apparatus such that, in operation, consumable products received in the compartment of the inner housing are immersed in the heat exchange fluid to exchange heat with the heat exchange fluid.

19 Claims, 26 Drawing Sheets

(51) Int. Cl.
    *A23B 11/145*     (2025.01)
    *F25D 17/02*     (2006.01)
    *F25D 25/00*     (2006.01)

(52) U.S. Cl.
    CPC ........... *F25D 17/02* (2013.01); *F25D 25/005* (2013.01); *F25D 2400/30* (2013.01)

(58) Field of Classification Search
    CPC .............. F25D 2400/30; F25D 31/007; F25D 2400/28; F25D 11/04; F25D 25/021; F25D 25/022; F25D 2303/0831; F25D 2331/803; F25D 2331/812; F25D 17/06; G06F 2200/201
    See application file for complete search history.

(56) References Cited

U.S. PATENT DOCUMENTS

| | | | |
|---|---|---|---|
| 2,824,432 A * | 2/1958 | Varese | A01J 9/04 220/592.12 |
| 3,019,620 A | 2/1962 | Costantini et al. | |
| 3,324,783 A | 6/1967 | Hickox | |
| 3,552,143 A | 1/1971 | Johnson | |
| 4,180,124 A * | 12/1979 | Shurcliff | F28D 20/02 126/400 |
| 4,817,650 A * | 4/1989 | Tilton | C25D 7/04 134/158 |
| 4,840,040 A | 6/1989 | Fung | |
| 5,003,787 A | 4/1991 | Zlobinsky | |
| 5,217,860 A | 6/1993 | Fahy et al. | |
| 5,601,143 A | 2/1997 | Binder | |
| 5,776,769 A | 7/1998 | Critser et al. | |
| 5,797,270 A | 8/1998 | Halterman et al. | |
| 6,018,961 A | 2/2000 | Venture et al. | |
| 7,112,576 B1 | 9/2006 | Hubel | |
| 9,448,006 B2 | 9/2016 | Kulkarni et al. | |
| 10,674,720 B2 | 6/2020 | Bauer et al. | |
| 2005/0241333 A1 | 11/2005 | Hamilton | |
| 2006/0063141 A1 | 3/2006 | McGann et al. | |
| 2006/0218960 A1 | 10/2006 | Furlanetto et al. | |
| 2007/0169489 A1 | 7/2007 | Bassler, Sr. | |
| 2008/0075821 A1 | 3/2008 | Lagares Corominas et al. | |
| 2013/0111931 A1 | 5/2013 | Grinter et al. | |
| 2015/0091430 A1 | 4/2015 | Popovitch et al. | |
| 2016/0198744 A1 * | 7/2016 | Vezzani | A23L 7/135 426/523 |
| 2016/0288999 A1 | 10/2016 | Caveney et al. | |
| 2017/0030632 A1 * | 2/2017 | Kranovich | F25D 31/003 |
| 2017/0234597 A1 | 8/2017 | Moon et al. | |
| 2018/0160676 A1 | 6/2018 | Matsumura et al. | |
| 2018/0224151 A1 | 8/2018 | Froehlich et al. | |

FOREIGN PATENT DOCUMENTS

| | | | | |
|---|---|---|---|---|
| CN | 209473495 U | * | 10/2019 | |
| CN | 212585265 U | * | 2/2021 | |
| EP | 0728995 A2 | * | 8/1996 | |
| EP | 2009563 A1 | | 12/2008 | |
| EP | 2545333 A2 | | 1/2013 | |
| GB | 2286879 B | | 9/1997 | |
| JP | H03-220101 A | | 9/1991 | |
| JP | 2018061460 A | | 4/2018 | |
| KR | 20160010183 A | | 1/2016 | |
| WO | WO-2005110128 A1 | * | 11/2005 | ........... A23L 1/0121 |
| WO | 2009/143364 A1 | | 11/2009 | |
| WO | 2011/110648 A2 | | 9/2011 | |
| WO | 2017/137552 A1 | | 8/2017 | |
| WO | WO-2018150216 A1 | * | 8/2018 | ............... F03G 7/05 |
| WO | 2020102854 A1 | | 5/2020 | |
| WO | 2021/203163 A1 | | 10/2021 | |
| WO | 2022/150870 A1 | | 7/2022 | |

OTHER PUBLICATIONS

Chauhan Amisha et al: "Experimental and CFD validation of the thermal performance of a cryogenic batch freezer with the effect of loading", ENERGY, vol. 171, Mar. 1, 2019 (Mar. 1, 2019), pp. 77-94, XP093137876, Amsterdam, NL.

Fukuyo K et al: "Thermal uniformity and rapid cooling inside refrigerators", International Journal of Refrigeration, Elsevier, Amsterdam, NL, vol. 26, No. 2, Mar. 1, 2003 (Mar. 1, 2003).

Karlsson Jens O.M. et al.: "Fertilization and development of mouse oocytes cryopreserved using a theoretically optimized protocol", Human Reproductions, vol. 11, No. 6, pp. 1296-1305, Jun. 1, 1996).

Liu Jun et al.: "Cryobiology of Rat Embryos II: A Theoretical Model for the Development of Interrupted Slow Freezing Procedures", Biology of Reproduction, vol. 63, No. 5, pp. 1303-1312, Nov. 1, 2000.

Bay Jiao, Cryopreservation of swine semen and the effect of post-insemination conception, Heilongjiang Journal of Animal reproduction, vol. 23, No. 2, pp. 21-22, Mar. 15, 2015 (published in Chinese—English translation provided).

* cited by examiner

METHOD AND APPARATUS FOR FREEZING CONSUMABLE PRODUCTS

CROSS-REFERENCE TO RELATED APPLICATIONS

This application is a U.S. National Stage Application under 35 U.S.C. § 371 of International Application No. PCT/AU2021/050313, filed Apr. 6, 2021, titled METHOD AND APPARATUS FOR FREEZING CONSUMABLE PRODUCTS, which claims priority to Australian Application No. AU2020901100, filed Apr. 8, 2020. International Application No. PCT/AU2021/050313 is incorporated by reference herein in its entirety for all purposes.

FIELD OF THE INVENTION

The present invention relates to methods of freezing consumable products and apparatuses for preserving consumable products.

BACKGROUND

Preservation of food by freezing is widely used in domestic and commercial environments. The temperature of the product is reduced to a point that all deterioration processes like chemical and enzymatic reactions, as well as microbial reproduction, are slowed down. Typically, enzymatic reactions such as lipase activity may be stopped by blanching the product prior to freezing.

Available domestic freezing systems have been designed to balance operational costs with a suitable freezing temperature that will increase product shelf life. The temperature range of such systems is predetermined and cannot be readily altered by a user. Most domestic freezing systems have an upright display design, which facilitates consumer access but may compromise cooling efficiency of the system.

Commercial freezing systems include liquid nitrogen individual quick-freezing (IQF) systems, liquid nitrogen immersion systems and air blast freezing. While some of these technologies can achieve high heat transfer rates, kill microbes and be in direct contact with food products, they all have decreased sensory outcomes (taste, texture, appearance) and are typically only appropriate for low value products.

While the preservation benefits of freezing food are well known, existing methods can result in a loss of quality, the main quality losses being textural and taste changes, often caused by dehydration of outer layers of the product. Another problem is "drip loss", whereby ice crystals grow within the product and puncture cell walls, causing juice to bleed out and resulting in loss of product mass upon thawing. This in turn can result in a loss of firmness, nutrition and flavour. The rate of ice crystal growth is more severe when slow freezing processes or multiple freeze/thaw cycles take place, due to liquid migration from inside of the cells to extracellular spaces. Fast freezing can minimise migration of water into extracellular spaces, thereby promoting formation of smaller intracellular ice, producing a more homogeneous structure with less damage to tissue and lesser drip loss. Cryogenic freezing systems are used frequently in biomedical contexts for preserving cells for later use. The cryopreservation process is generally made up of two main steps:

1. Controlled cooling and preservation of cells
   in this step, liquid is removed from the cell and replaced with a cryoprotectant then placed into a controlled liquid nitrogen bath to achieve vitrification
2. Liquid nitrogen long term preservation
   once the cell is preserved through controlled cooling, it is placed into liquid nitrogen storage tanks where it will remain preserved for a several years or until required.

IQF technology and liquid nitrogen immersion systems for food preservation are based broadly on the second step, but as described above, the process can be damaging to the product as well as inefficient. The first step is not generally used as a solution to preserving food products, because food products cannot have their liquids removed and replaced with cryoprotectants.

Additionally, phase transitions of foods are highly relevant in the quality of preserved foods. Glasses, being non-crystalline, have a disordered structure similar to that of the liquid or amorphous state. In the glassy state, compounds involved in deterioration are able to diffuse only very slowly over molecular distances. Therefore foods below the glass transition temperature have a high degree of stability for a number of months or even years. Glass transition temperatures are typically reported for pure components rather than real foods, due to the fact that foods are composed of multi-component mixture thus making overall properties difficult to predict. This is a continuing challenge in the area of food preservation, where consistent and accurate data is not present and is difficult, if not impossible, to achieve.

In this context, there is a need for a reliable method of food preservation by freezing which successfully balances a) the need to achieve target temperatures that result in microbial reduction or elimination, against b) required rates of freezing to reduce ice crystal formation and thereby cellular damage, and c) economic viability.

While immersion tanks for freezing food exist, systems to date have suffered the problems of high viscosity of the fluid at lower temperatures and maintaining the fluid free from organic contaminants. Where packaging is used in an attempt to contain the food products and prevent contamination, the packaging tends to crack or be otherwise damaged, during rapid cooling processes, including freezing using liquid nitrogen processes.

There is a need for improved systems of preserving consumable products (for example, fish, meat, milk, etc.) in a cost-effective manner that maintains integrity of the original food product such as reducing negative impacts on taste and nutritional value, and increases safety of the products.

SUMMARY

According to a first aspect of the present invention, there is provided an apparatus for preserving consumable products comprising an inner housing arranged within an outer insulated housing, wherein walls of the inner housing define a compartment for receiving consumable products, said walls comprising an inlet wall for inflow of a heat exchange fluid into the compartment, an opposed outlet wall for outflow of a heat exchange fluid out of the compartment, side walls and a base, the side walls and base adjoining the inlet wall to the outlet wall, wherein the inlet wall and outlet wall each include a series of apertures to accommodate a continuous heat exchange fluid flow through the apparatus such that, in operation, consumable products received in the compartment of the inner housing are immersed in the heat exchange fluid to exchange heat with the heat exchange fluid.

According to a second aspect of the present invention, there is provided a method of preserving consumable products in a preservation apparatus using a heat exchange fluid, the method comprising:
a. determining the total surface area of an approximated geometry of the consumable products to be frozen;
b. performing computational fluid dynamics analysis on the consumable products within the apparatus based on flow constraints due both to the tank geometry and predetermined arrangement of food products in the tank and a predetermined increase in temperature of the heat exchange fluid;
c. determining heat transfer coefficients of the consumable products at predetermined product surface temperatures;
d. selecting a heat transfer coefficient by rounding down the lowest heat transfer coefficient determined at step (c) to the nearest ten;
e. dividing the approximated geometry of the consumable products into a predetermined number of equally distributed volume increments;
f. estimating thermal properties of the consumable products;
g. calculating, based on conservation of energy analysis using the heat transfer coefficient determined at step (d), the time required for each increment to reach a predetermined final temperature from a predetermined initial temperature for a predetermined heat exchange fluid temperature and a predetermined flow rate of the heat exchange fluid;
h. determining an achievable average rate of cooling based on the time calculated at step (f);
i. if the determined average rate of cooling that can be achieved is 0.5° C. per minute or more, selecting said predetermined heat exchange fluid temperature, and if the determined average rate of cooling that can be achieved is less than 0.5° C. per minute, selecting a heat exchange fluid temperature sufficiently less than the predetermined heat exchange fluid temperature such that the rate of cooling achievable is at least 0.5° C. per minute;
j. arranging the consumable products in the apparatus for preservation; and
k. subjecting the consumable products to cooling using the temperature determined at step (i) and cooling the consumable products at a rate of at least 0.5° C. per minute.

The total surface area may be the total surface area of a simplified geometrical estimation of the consumable products. For example, milk bottles may be approximated as cylinders and thus the total surface area would be the total surface area of those cylinders.

A consumable product may be a food product, for example, fish or meat, vegetables, or other foodstuffs. Consumable products may also comprise liquid products such as milk or other drinks or liquid ingredients. The consumable product as used herein may also refer to the product to be consumed in addition to its packaging, for example bottles, plastic film, etc.

Preferred embodiments of the methods and apparatuses disclosed herein may minimise ice crystal formation and prevent cellular damage during preservation.

Preferred embodiments of the methods and apparatuses disclosed herein provide for preservation without the use of any sugars or synthetic additives.

Preferred embodiments of the methods disclosed herein provide for preservation without sublimation of the consumable product.

Preferred embodiments of the methods and apparatuses disclosed herein provide reduced drip loss compared to conventional freezing.

Preferred embodiments of the methods and apparatuses disclosed herein provide for preservation of consumable products wherein the nutritional value is retained and safety of the products is retained or improved compared to the fresh product.

BRIEF DESCRIPTION

Embodiments of the present invention will now be described, by way of non-limiting example only, with reference to the accompanying drawings, in which.

DETAILED DESCRIPTION

Immersion Tank

Figure 1:
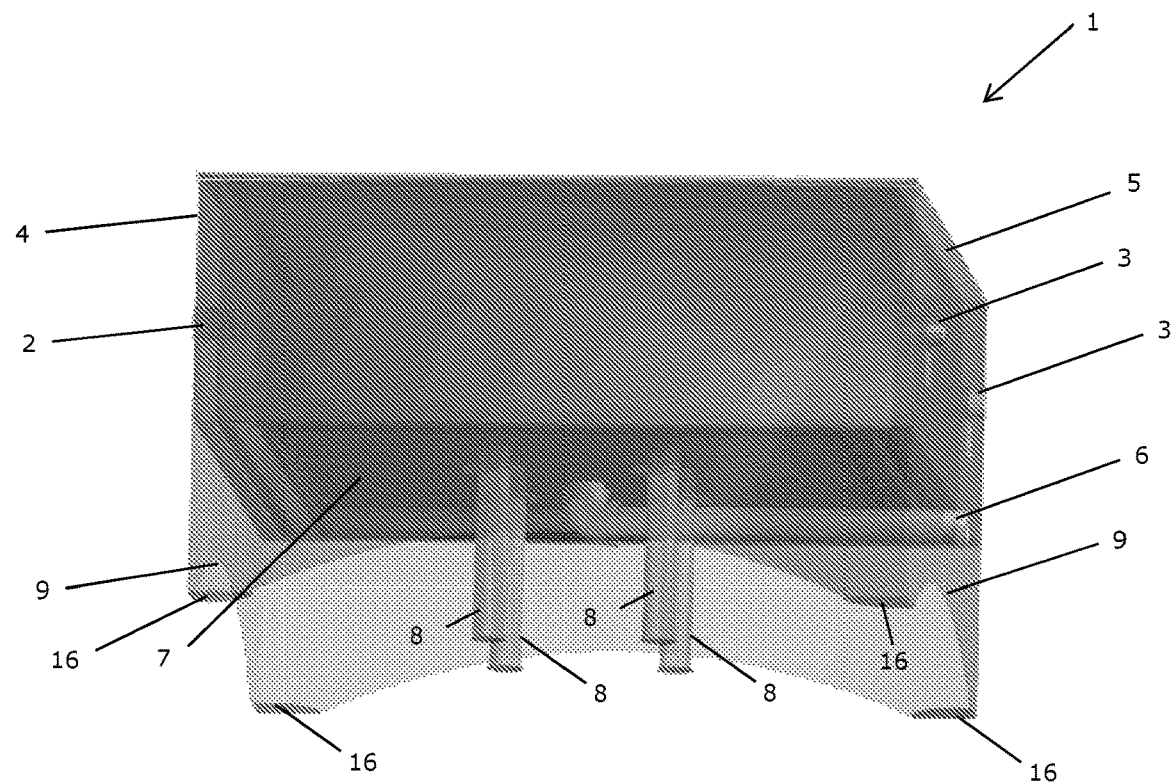
FIG. 1 is a lower perspective view of a tank for preservation of consumable products.
Figure 2:
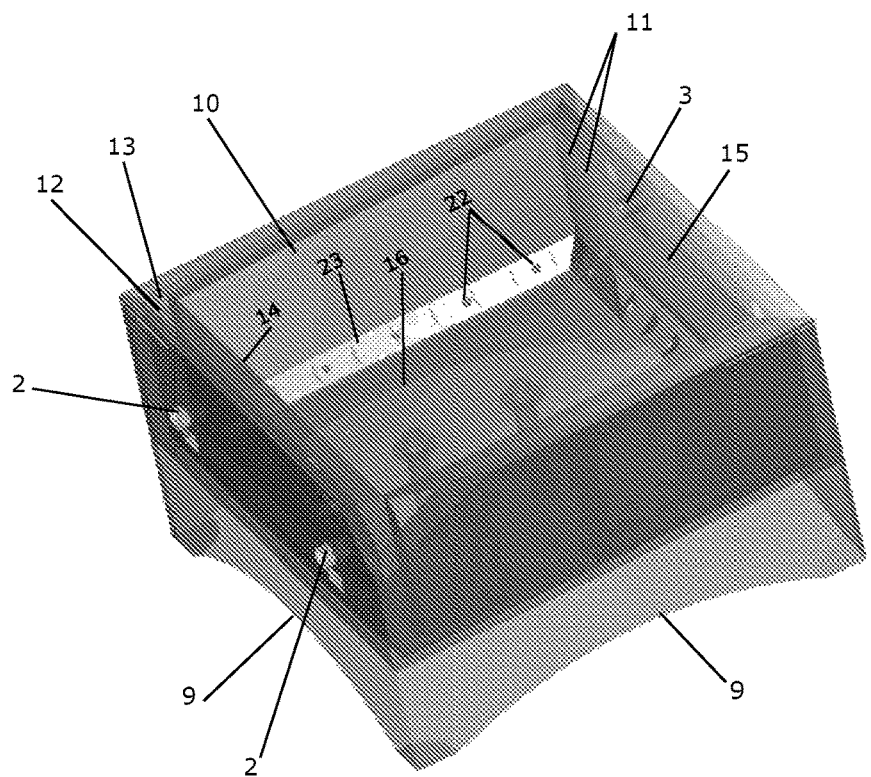
FIG. 2 is an upper perspective view of a tank for preservation of consumable products.

FIGS. 1 and 2 show an immersion tank 1 for preservation of a consumable product. In this example, the immersion tank 1 is shown containing bottles and has a capacity to hold up to 100 milk bottles. The tank 1 is constructed of steel to conform with ASTM A240. The tank 1 has two heat exchange fluid inlets 2 and two heat exchange fluid outlets 3, the inlets 2 being situated on an inlet wall 4 and the outlets 3 being situated on an outlet wall 5. FIG. 2 shows an inner housing 10 situated internally of the outer walls of the tank 1. Inner housing 10 has an inlet wall 14, outlet wall 15 and base 16, each including apertures 11 to allow inflow and outflow of heat exchange fluid into and out of the inner housing 10. The apertures 11 are provided in four rows of ten on the inlet wall 14 and outlet wall 15, and ten rows of ten on the base 16. The apertures 11 on inlet wall 14 and base 16 are 10 mm in diameter and the apertures 11 on the outlet wall 15 are 20 mm in diameter. The inlet wall 14 is spaced 100 mm away from an inner face 12 of the inlet wall 2, thus providing void 13. A similar void is provided between outlet wall 15 and an inner face of outlet wall 5. A 100 mm void space is further provided in the base. Inner face 12 is defined by steel sheet formwork arranged 50 mm from the inlet wall 2 and secured by brackets, providing a cavity into which polyurethane foam insulation is pumped during manufacture of the tank 1. Insulation is provided in a similar manner in all four walls of the tank from the top of the tank to approximately 595 mm down the walls of the tank. Rows of holes 22 of 30 mm diameter are provided along strips 23 which sit at an angle of approximately 45° between the base 7 and the walls of the tank along the bottom of each wall. The strips 23 are provided to brace the tank structure and can also be used as guides to prevent the trays or basket resting against the walls or base of the inner housing 10. It will be appreciated that other arrangements are possible which also brace the tank structure and perform a guide function. The holes 22 help to reduce stagnation of the heat exchange fluid that may accumulate in these regions of the tank due to the presence of the strips 23.

A drain 6 is provided from the base 7 of the tank 1 and is shaped as an elbow pipe directed to extend beyond the outlet wall 5 of the tank 1, below the heat exchange fluid outlets 3. The heat exchange fluid inlets 2 and the heat exchange outlets 3 have a diameter of 80 mm.

Figure 3:
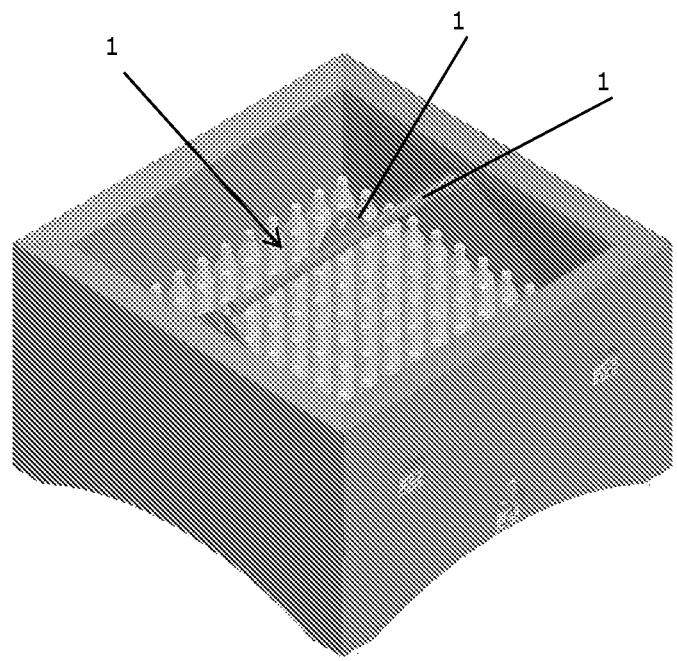
FIG. 3 is an upper perspective view of a tank containing milk bottles.

The tank 1 further includes a lid formed of steel sheet (not shown). The base 7 of the tank 1 includes four central leg portions 8 supporting the central weight of the tank 1, as well as feet 16 situated at the corners of the tank 1 and formed at the ends of the tank walls. Cut-out portions 9 are provided on the lower ends of the tank walls to provide access for maintenance of the base 7 of the tank. The tank 1 has a height of about 1.105 m and is arranged in a square configuration having side lengths of 1.705 m. In the case of freezing milk, as shown in FIG. 3, a structure comprising a bottle basket 17 is suspended from the lid (not shown) by a bar 18 having hooks at its opposed ends, the bar 18 being attachable to the lid by attachment portion 19.

Figure 4:
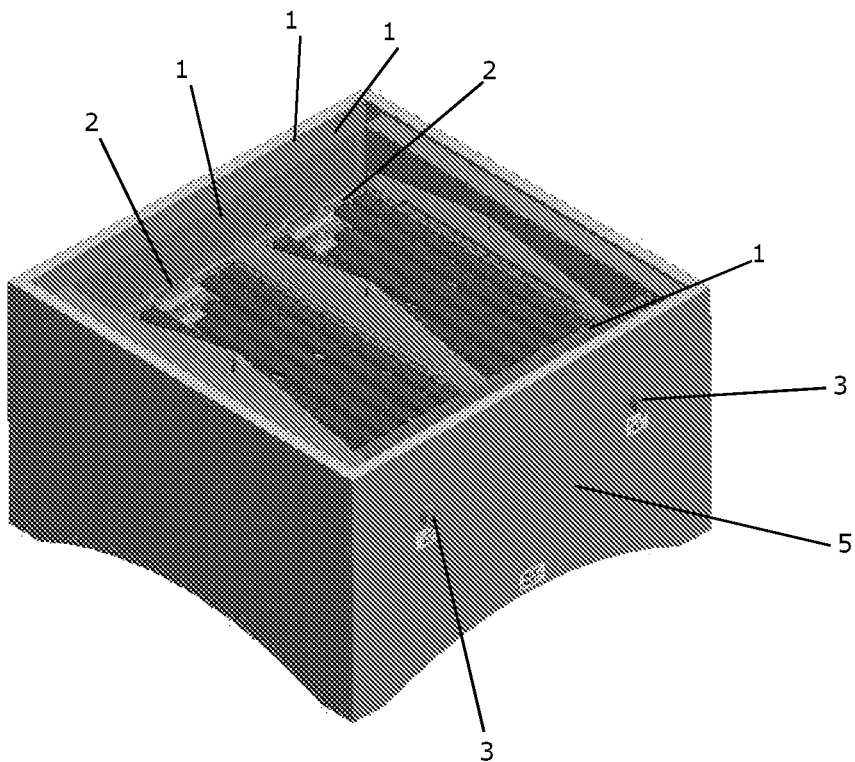
FIG. 4 is an upper perspective view of a tank containing trays for fish or meat.

As shown in FIG. 4, a structure comprising 40 kg rack trays 21 can be suspended from the lid for preserving meat and fish.

Figure 5:
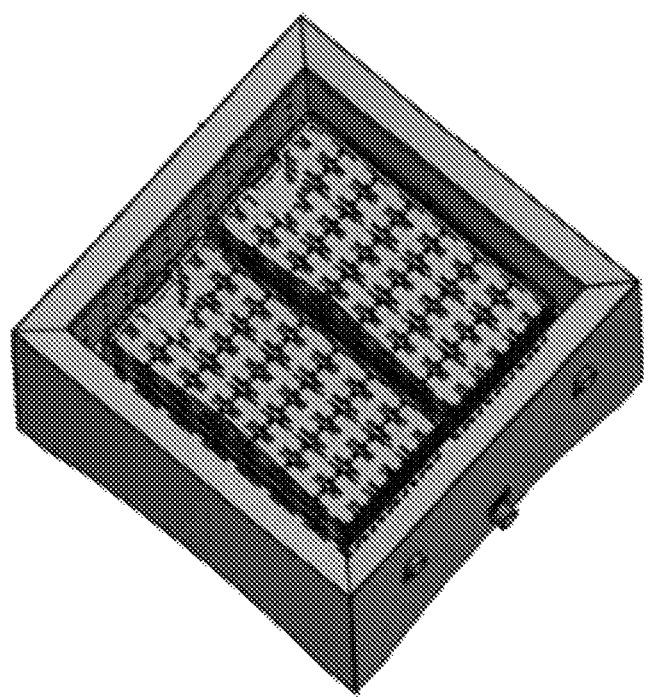
FIG. 5 is an upper perspective view of a tank containing trays for fish or meat.
Figure 6:
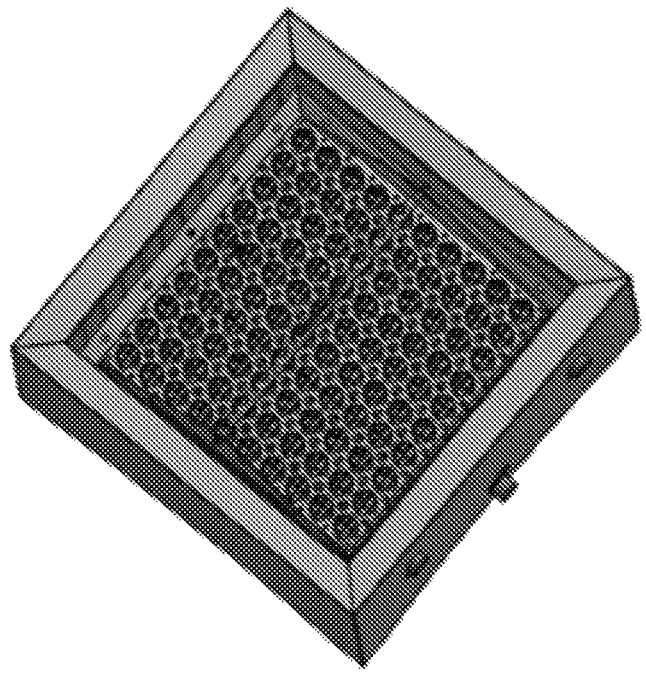
FIG. 6 is an upper perspective view of a tank containing an empty basket for holding bottles.

FIG. 5 shows an upper perspective view of the meat/fish rack trays 21 in the tank 1. FIG. 6 shows the bottle basket 17 in the tank 1. The bottle basket 17 includes receiving holes 20 for holding the sides of the bottles.

Figure 7:
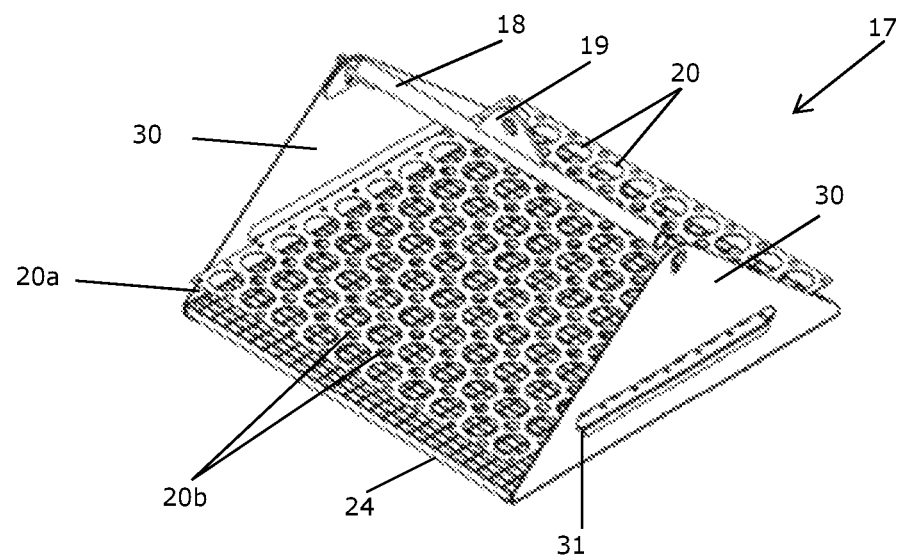
FIG. 7 is an upper perspective view of a basket for bottles.

FIG. 7 shows the bottle basket 17 in isolation. The basket 17 has a base 24 and opposed sides 30. The sides 30 are attached to opposed ends of bar 18 which are to be attached to the lid via attachment portion 19. Bottle stabiliser portion 20a includes bottle-receiving portions 20 and is attached to the basket 17 by clipping into slots 31 provided in opposed sides 30. Further holes 20b are provided between the bottle-receiving portions 20, facilitating fluid flow between the bottles when the basket 17 is filled with bottles and immersed in heat exchange fluid.

Figure 8:
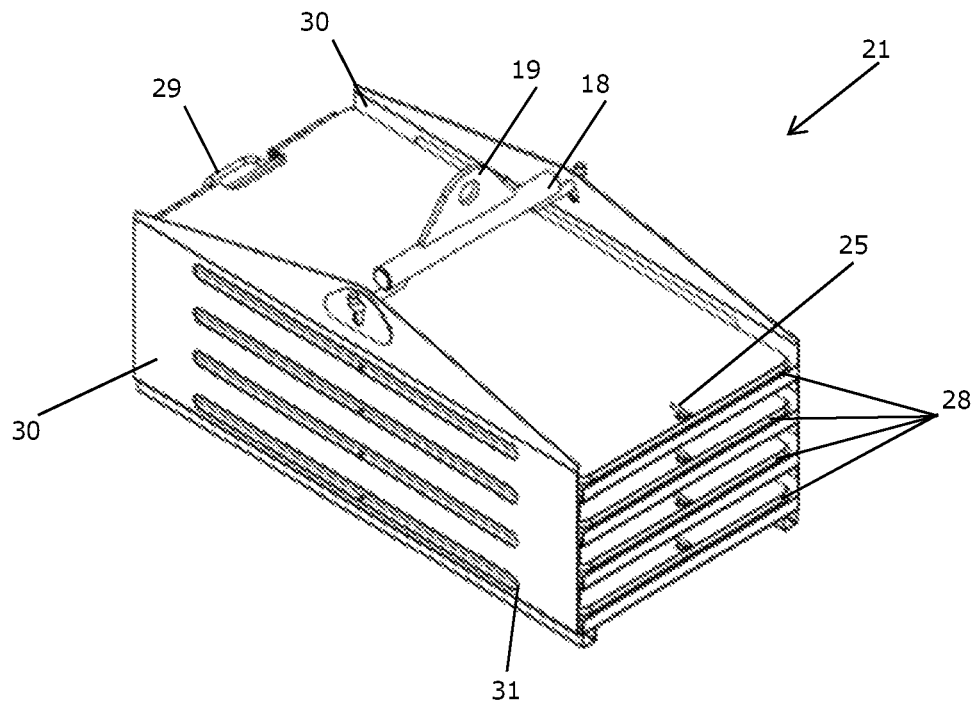
FIG. 8 is an upper perspective view of a rack for holding trays of meat or fish.

FIG. 8 shows the meat/fish rack tray 21 in isolation. The rack tray 21 also includes opposed sides 30 into which individual trays 28 can clip at slots 31. The individual trays 28 are each closed with latches 25. The rack tray 21 is hung from opposed ends of bar 18 and attached to an underside of the lid of the tank by attachment portion 19. A user can grasp handle 29 to slide out individual trays 28 from the rack 21.

Figure 9:
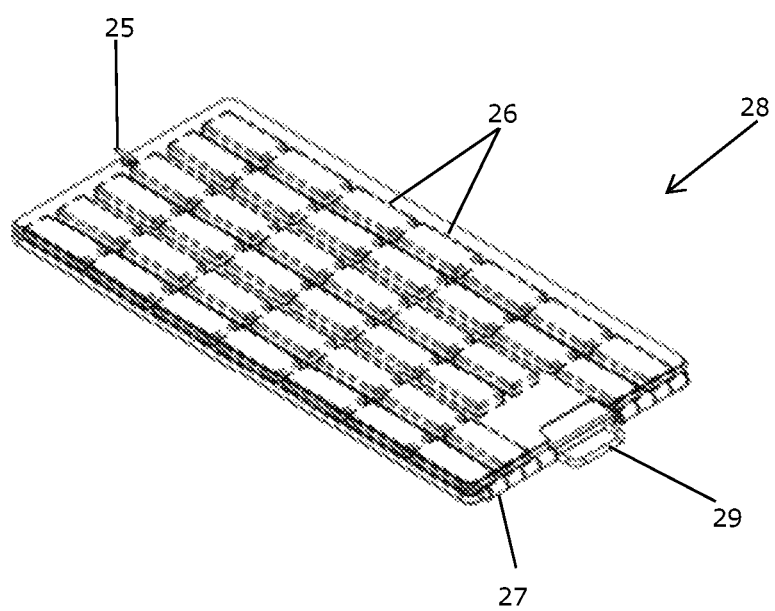
FIG. 9 is an individual tray for holding meat or fish.

FIG. 9 shows an individual tray 28 in isolation. The tray has shaped portions 26 for enclosing individual pieces of meat or fish. The tray 28 is closed about a hinge joint 27 and secured by latch 25.

The tank 1 is filled with heat exchange fluid which does not freeze above −70° C. The heat exchange fluid is pumped into the tank 1 via the heat exchange fluid inlets 2 into cavity 13 at a volumetric flow rate of 17 cubic metres per hour. Pressure is built up in the cavity 13 as heat exchange fluid is forced through the restricted areas of the apertures 11, thus reducing the volumetric flow rate but increasing velocity of the fluid entering the inner housing 10. Some fluid will also travel below the inner housing 10 and be forced up to the opposing cavity in the outlet wall 5, with some fluid also travelling up through apertures 11 provided in the base 7 of the inner housing 10. The apertures 11 provide improved distribution of cold fluid to all parts of the tank (see FIG. 10, for example, showing temperature distribution throughout the tank) and minimise the occurrence of hot spots which would otherwise be likely to occur away from the inlet area. As the heat transfer fluid flows continuously through the tank 1, heat is removed from the milk and milk bottles, and the heated heat exchange fluid leaving the tank 1 will then be exchanged with a refrigeration system which continuously cools the heat exchange fluid. The heat exchange fluid itself exchanges heat with refrigerant in the refrigeration system.

Preferably, a low range heat transfer fluid is used as the immersion fluid for the tank which, advantageously, has a relatively low viscosity even at very low temperatures, thus reducing the pump power requirements for the system. The below table (Table 1) specifies some of the thermal properties of the heat transfer fluid.

TABLE 1

Thermal properties of the heat transfer fluid

| Temperature [° C.] | Density [kg/m3] | Specific Heat [J/kg-K] | Conductivity [W/m-K] | Viscosity [Pa-s] |
|---|---|---|---|---|
| −73.3 | 827 | 1630 | 0.1591 | 0.154 |
| −59 | 820 | 1717 | 0.1585 | 0.038 |
| −45.6 | 815 | 1760 | 0.1574 | 0.016 |
| −17.8 | 791 | 1840 | 0.1539 | 0.005 |
| 23.9 | 755 | 2010 | 0.1504 | 0.0015 |

At each of the above temperatures, the heat exchange fluid has a density that is very low and lesser than that of water. Advantageously, if any breakage or spillage were to occur during operation of the tank, the broken or spilled matter will tend to sink to a lower portion of the tank, facilitating drainage of that matter without substantial loss of heat exchange fluid. It will be appreciated that any suitable heat exchange fluid can be used, provided that it has a low enough viscosity that it will not require excessive pump power at the required low temperatures for preservation. It is also preferable that the heat exchange fluid be food safe.

TABLE 2

Flow rate of the heat transfer fluid for various temperature differences @ 20 kW (−50° C.)

| Temperature difference [° C.] | Mass flow rate [kg/s] | Volumetric flow rate [m³/hr] |
|---|---|---|
| 1 | 11.5 | 50.9 |
| 2 | 5.8 | 25.5 |
| 3 | 3.9 | 17 |
| 4 | 2.9 | 12.7 |
| 5 | 2.3 | 10.1 |
| 10 | 1.15 | 5.1 |

Table 2 above provides the temperature difference between the tank inlet and outlet for various flow rates of heat exchange fluid, assuming 20 kW of heat is extracted from the fluid in the tank. From Table 2, it can be seen that a temperature difference of 3° C. between inlet and outlet can be achieved using a mass flow rate of approximately 4 kg/s. This temperature difference was deemed an acceptable temperature rise in terms of evaporator duty required as well as cooling of the product required. The acceptable temperature rise must be balanced against costs associated with the maximum number of product that can be processed at once to make the system commercially viable. It will be appreciated that a higher flow rate may be desirable in increasing the heat transfer between the heat exchange fluid and the consumable product. However, a higher flow rate will also cause higher flow resistance and thus a higher pumping power would be required.

Computational Fluid Dynamics Analysis of Milk

Computational fluid dynamics analysis is performed on the tank in order to visualise how the heat exchange fluid flows in the tank, to estimate the heat transfer coefficient between the heat exchange fluid and the consumable product, and to determine the pressure loss as the heat exchange fluid flows through the tank.

Figure 10:
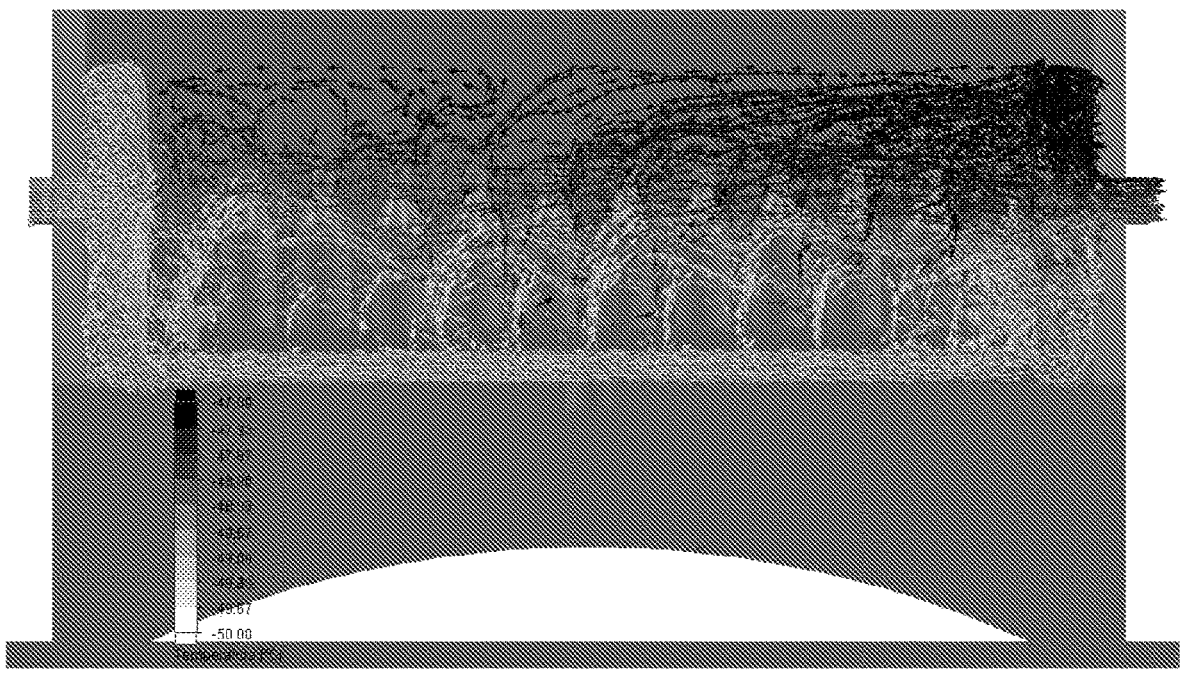
FIG. 10 is an image showing computational fluid dynamics analysis of temperature in a tank containing 100 1 L bottles of milk.

FIG. 10 is a side view of a simulated flow analysis of heat exchange fluid in the tank for the case where the bottle surface temperature is specified as −30° C. The figure is shade-coded to represent the various temperatures at different points within the tank, with black representing the warmest zones and white representing the coldest zones. The arrows indicate the flow trajectories of the fluid as it moves through the tank and around the bottles. Cold fluid at −50° C. is able to surround the bottles due to the distribution provided by apertures 11. As can be seen from this figure, the heat exchange fluid enters the tank at approximately −50° C. through the inlet wall at the left side of the tank in this view. As the heat exchange fluid absorbs heat from the consumable product (in this case, milk bottles), slightly warmer heat exchange fluid at approximately −47° C. accumulates at the top of the tank before it exits through the outlet wall. A 3° C. increase in temperature of heat exchange fluid was considered acceptable.

Figure 11:
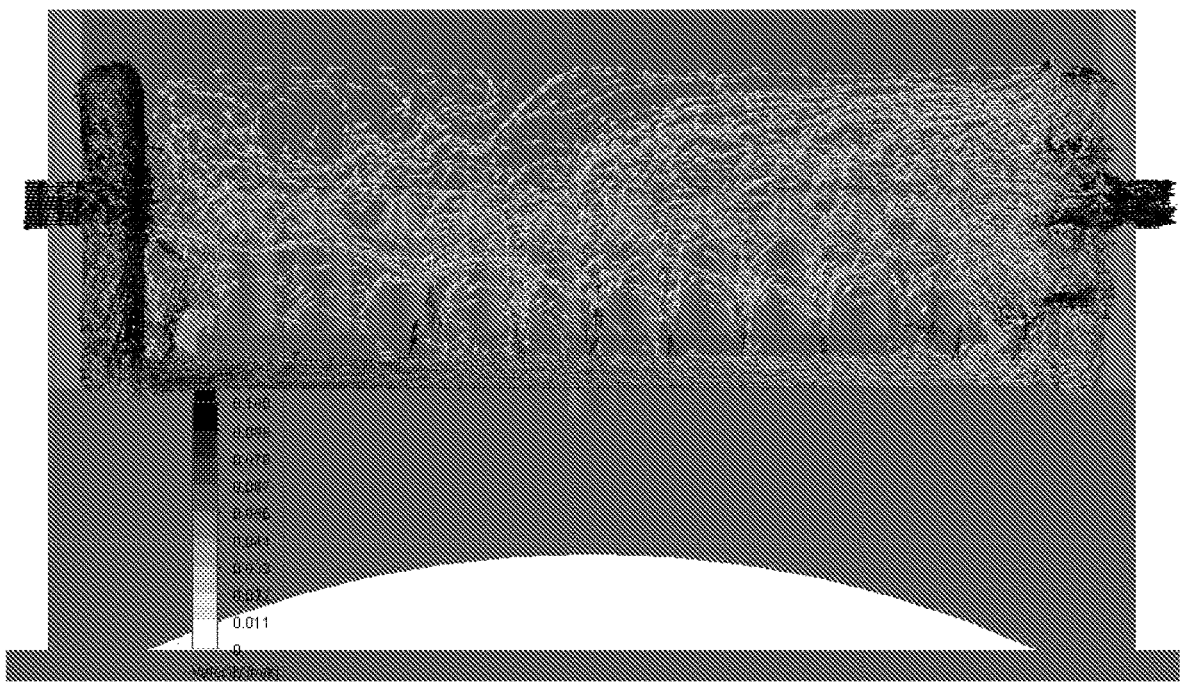
FIG. 11 is an image showing computational fluid dynamics of fluid velocity in a tank.

FIG. 11 is a side view of a simulated flow analysis of heat exchange fluid in the tank for the same case, though the figure is shade-coded to represent the various flow velocities. The velocities in the tank around the milk bottles is very low, i.e. less than 0.02 m/s. However, the velocities are high at the inlet wall (on the left of the image) as the fluid passes through the apertures, at various aperture points in the base and somewhat higher at the aperture of the outlet wall (on the right of the image).

Figure 12:
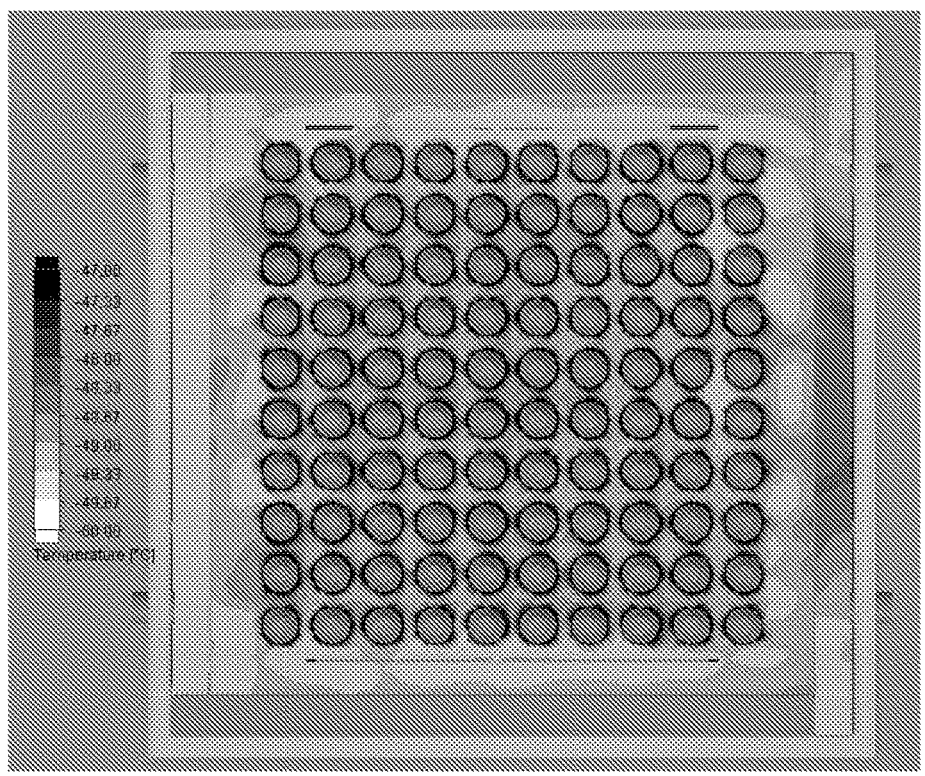
FIG. 12 is conductivity top view of the analysis shown in FIG. 10.
Figure 13:
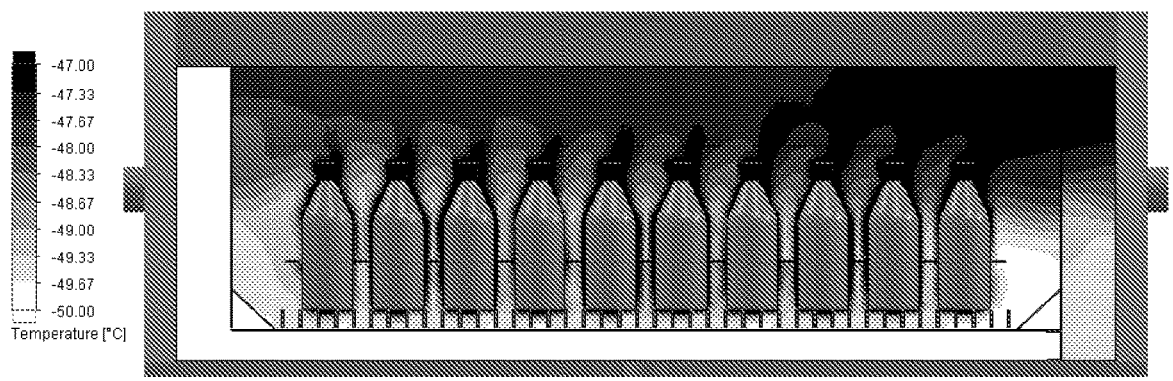
FIG. 13 is a cut plot between rows of bottles showing temperature distribution in the tank.

FIG. 12 is a top view of the tank under the same conditions as those for FIGS. 10 and 11, shade-coded for temperature distribution.

A similar process of analysis is performed at various other bottle surface temperatures and the below table (Table 3) is produced, showing the average heat transfer coefficients determined between the milk (including bottles) and the heat exchange fluid.

TABLE 3

Results of computational fluid dynamics analysis of milk bottles

| Bottle Surface Temperature [° C.] | Inlet Temperature [° C.] | Bottles total surface area [m$^2$] | Rate of heat transferred from bottles [W] | Heat Transfer Coefficient [W/m$^2$K] |
|---|---|---|---|---|
| 0 | −50 | 7.1655 | 65138 | 181 |
| −10 | −50 | 7.1655 | 38964 | 135 |
| −20 | −50 | 7.1655 | 29204 | 135 |
| −30 | −50 | 7.1655 | 20307 | 141 |
| −40 | −50 | 7.1655 | 11892 | 165 |

As the flow velocity of the heat exchange fluid was set very low, the convective heat transfer from the bottles to the heat exchange fluid is largely driven by natural movement of the fluid caused by the local heating of the fluid and the corresponding density differences, i.e. buoyancy-driven flows. Pressure drop is from the inlet to the outlet is found to be approximately 660 Pascal for a flow rate of 4 kg/s.

Heat Transfer Analysis on Milk

Further analysis is performed by investigating the influence of varying input parameters of the refrigeration system. This may include the geometry of the product, the temperature of the product, the characteristics of the packaging and the characteristics of the racking systems utilised. The method involves dividing the consumable product into geometrical increments (e.g. cylindrical shells for bottles). For every one of these increments, a conservation of energy equation is solved, i.e. for a given time-step, a certain amount of energy is removed from a shell, resulting in a decrease in temperature of that shell. The amount of energy removed is a function of the temperatures of the adjacent shells, as well as the resistance to heat flow between the shells. This involves taking into account thermal properties of the consumable product as a function of temperature.

Figure 14:
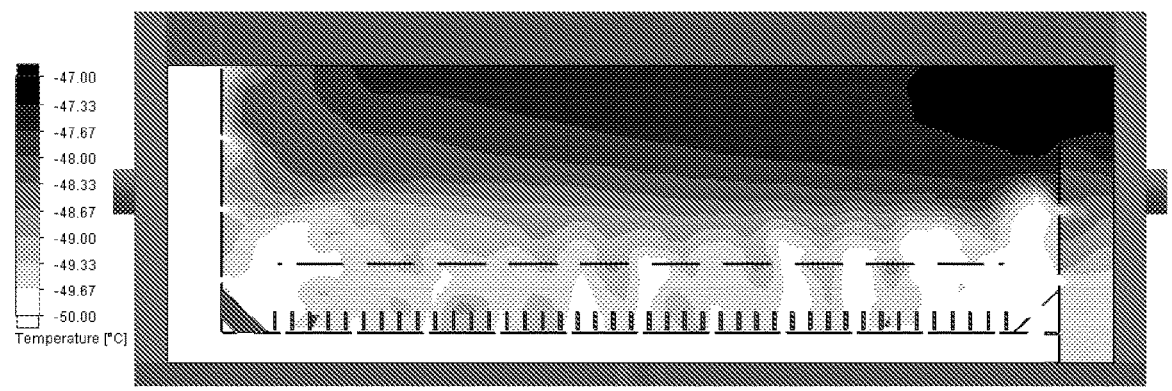
FIG. 14 is a cut plot through a row of bottles showing temperature distribution in the tank.
Figure 15:
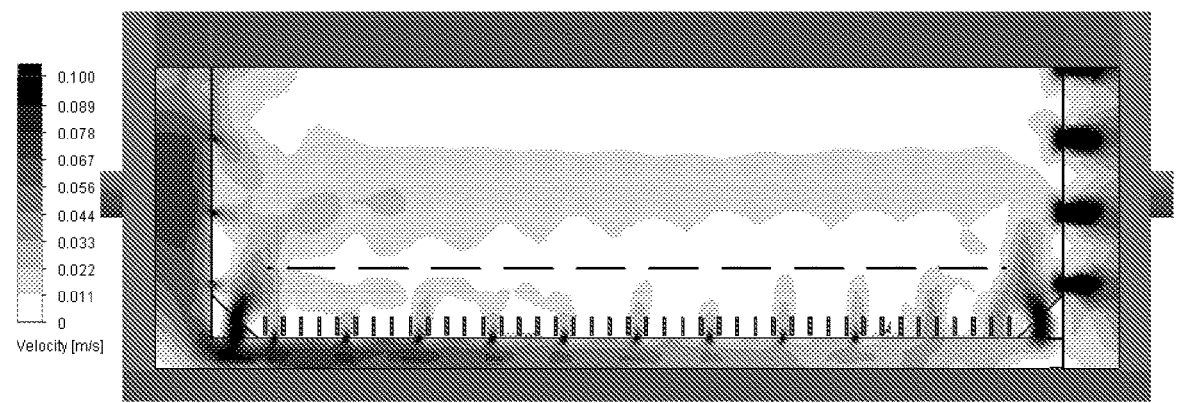
FIG. 15 is a cut plot through a row of bottles showing velocity distribution in the tank.
Figure 16:
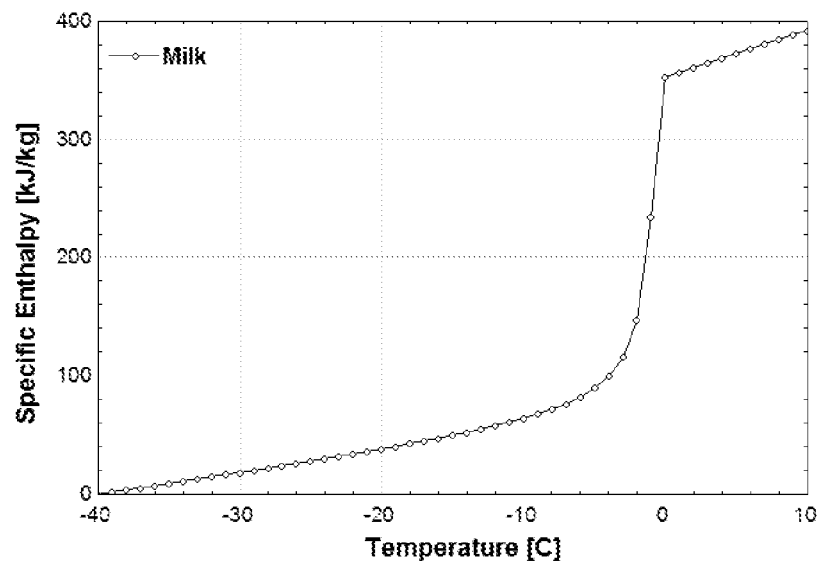
FIG. 16 is a graph showing the relationship of specific enthalpy with temperature for whole milk.
Figure 17:
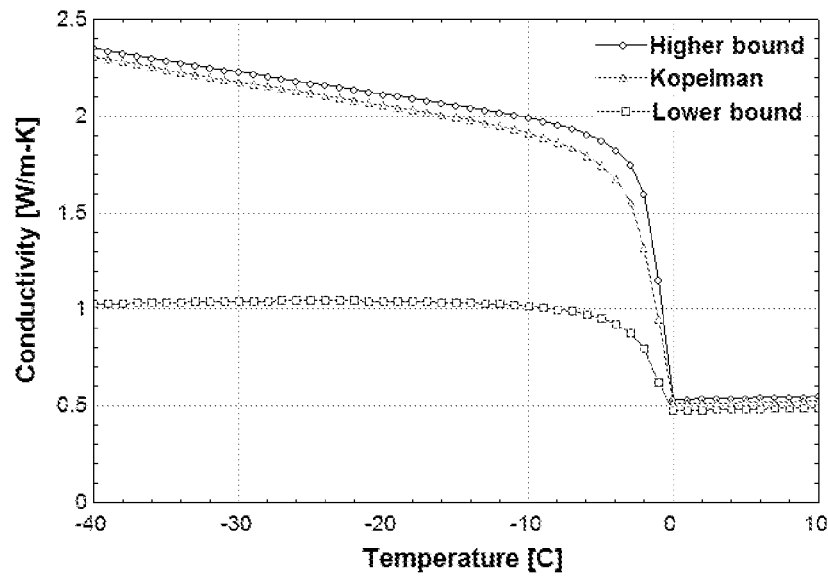
FIG. 17 is a graph showing conductivity of the milk.

Analysis is performed assuming that the milk can be treated as a solid mass having a starting temperature of 2° C. and the properties given in the ASHRAE Engineering Handbook—Refrigeration, Thermal Properties of Foods (including protein, fat and water contents). FIG. 16 is a plot of specific enthalpy values of whole milk at different temperatures obtained from the Handbook. FIG. 14 is a graph showing the conductivity of whole milk as determined by the Kopelman method.

A number of cases are investigated to assess different geometries of milk bottle products and different temperatures of the heat exchange fluid. The table below (Table 4) provides a summary of investigated cases.

TABLE 4

Investigated cases for different milk bottle geometries and inlet temperature of heat exchange fluid

| # | Product | Geometry (diameter and volume) | Outer Layer | Heat Exchange Fluid Temperature [° C.] | Heat Exchange Fluid Flow [kg/s] | HTC [W/m$^2$-K] |
|---|---|---|---|---|---|---|
| 1 | Milk | 85 mm bottle - 1000 mL | 1 mm glass | −50 | 4 | 130 |
| 2 | Milk | 85 mm bottle - 1000 mL | 1 mm glass | −70 | 4 | 130 |
| 3 | Milk | 69 mm bottle - 500 mL | 1.5 mm plastic | −50 | 4 | 130 |
| 4 | Milk | 69 mm bottle - 500 mL | 1.5 mm plastic | −70 | 4 | 130 |

In view of the results obtained from the computational fluid dynamics analysis shown in Table 3, a conservative heat transfer coefficient was estimated as 130 W/m²·K, which was obtained by taking the lowest simulated heat transfer coefficient and rounding it down to the nearest ten. The table below (Table 5) shows the freezing time results for the above investigated cases as predicted by simulation software.

TABLE 5

Freezing time results for milk

| # | Geometry | Heat Exchange Fluid Temperature [° C.] | Time for product average temperature to reach −30° C. [minutes] | Time for product core temperature to reach −30° C. [minutes] |
|---|---|---|---|---|
| 1 | 85 mm bottle | −50 | 39.5 | 43.5 |
| 2 | 85 mm bottle | −70 | 25.5 | 32 |
| 3 | 69 mm bottle | −50 | 39 | 41 |
| 4 | 69 mm bottle | −70 | 26 | 29 |

Figure 18:
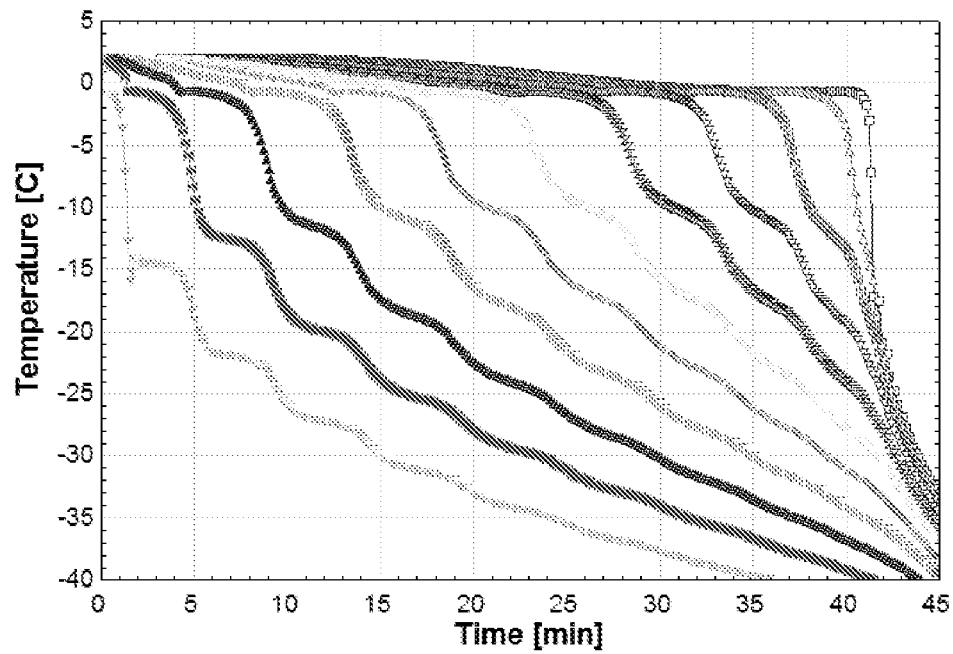
FIG. 18 is a graph showing temperature reduction over time at 11 equally distributed increments for a first case of preserving milk.

FIG. 18 is a graph showing the temperature-time relationship at the eleven geometrical equally distributed increments from the surface of the bottles to the core for investigated case #1. As can be seen from FIG. 18, a rapid drop in temperature is observed within the first five minutes for the outermost layer of the bottle, whereas a significant drop in temperature at the core is not observed until approximately 41 minutes. Additionally, the core temperature does not reach −30° C. until approximately 43.5 minutes. It is hypothesised that this outcome may minimise ice crystal formation.

Figure 19:
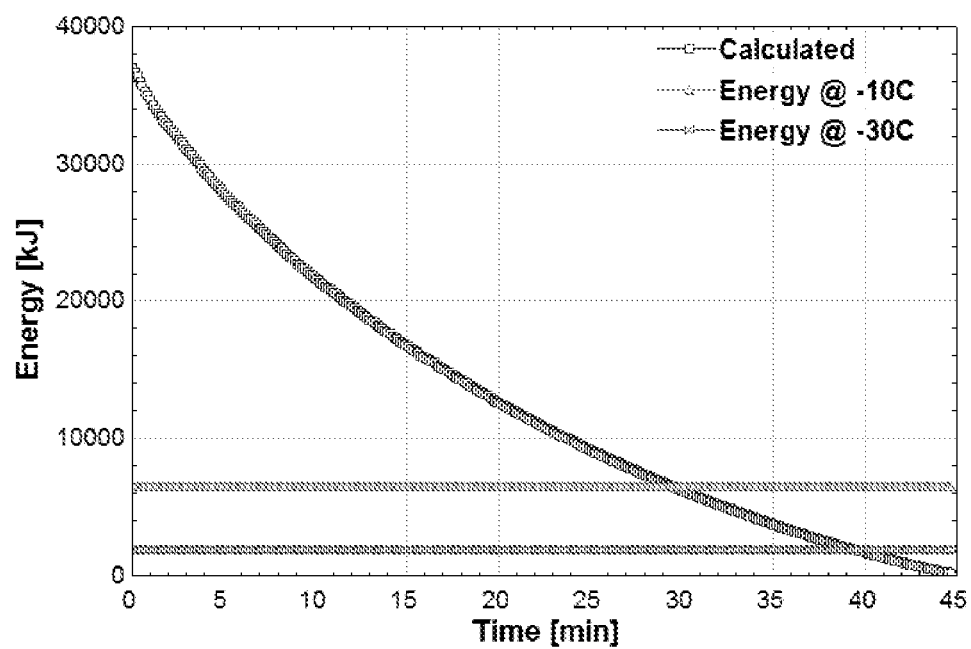
FIG. 19 is a graph showing energy levels over time for a first case of preserving milk.

FIG. 19 shows the total enthalpy over time for investigated case #1, as compared against the energy level at which the average temperature of the product is at −10° C. and −30° C. respectively. These target temperatures of −10° C. and −30° C. were selected as relevant targets based on a number of factors. For example, microbial activity is killed or slowed at different temperatures based on the microbe concerned, as well as at different rates of cooling and duration of time at the target temperature. In particular, storage of foods at −10° C. for a few days is lethal to certain microbes including *Toxoplasma gondii*, entamoeba and trypanosomes. However, these temperatures must be achieved within a reasonable time frame for commercial viability and, additionally, quick freezing is necessary to minimise ice crystal formation resulting in cell damage. The selected values balance these factors of economic considerations, potential cell damage (resulting in sensory deterioration of food products) and microbe destruction and/or retardation.

It was decided that the refrigeration system must preserve 100 1 L milk bottles starting at 4° C. to a final temperature of −30° C. within 35 minutes.

Mass of milk is calculated at 103.8 kg

Specific enthalpy of milk at 4° C. is 369 kJ/kg

Specific enthalpy of milk at −30° C. is 18.5 kJ/kg

The required energy removal from the milk is given by:

$$m(h_{initial} - h_{final}) \qquad (1)$$

where m=mass of milk $h_{initial}$=initial specific enthalpy of milk (at 4° C.)

$h_{final}$=final specific enthalpy of milk (at −30° C.)

Therefore, the heat removed from the milk is:

$$103.8\ (369-18.5)=36\ 382\ (kJ)$$

For a freezing period of 35 minutes, the required rate of heat removal is:

$$36\ 382/(35\ (mins) \times 60\ (secs))=17.3\ (kW)$$

Assuming a gain of 1 kW heat from atmosphere, the required refrigeration system duty is 18.3 kW. Freezing of milk is seen as the highest load on the refrigeration system thus the system must be specified at least to be able to preserve 100 1 L bottles of milk in 35 minutes, i.e. at least 18.3 kW. Accordingly, an evaporator duty of 20 kW is assumed as an initial design condition for the refrigeration system, including a safety margin of 1.7 kW. The inlet temperature of the tank may be −50° C. or −70° C.

Returning to case #1, the 85 mm diameter glass bottles of milk are being cooled by a heat exchange fluid having an inlet temperature of −50° C. and a flow rate of 4 kg/s, and a heat transfer coefficient of 130 W/m²·K. The thickness of the glass outer layer is 1 mm.

Figure 20:
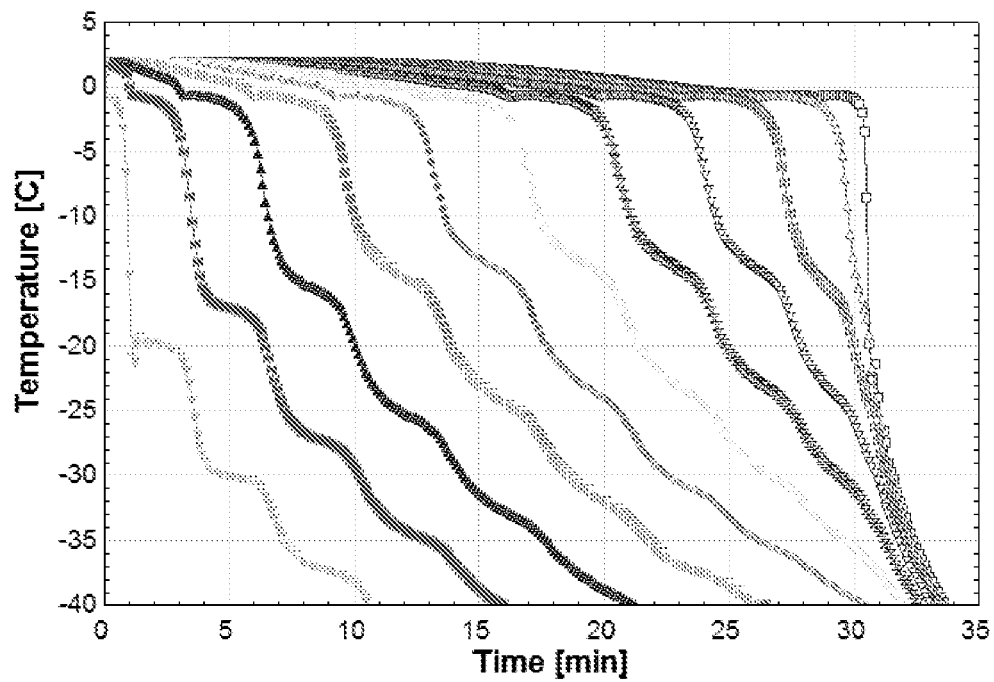
FIG. 20 is a graph showing temperature reduction over time at 11 equally distributed increments for a second case of preserving milk.

FIG. 20 shows the temperature profiles at equally distributed increments of case #2. In this case, the milk is contained in glass bottles of 85 mm diameter, 1 mm thickness, and a capacity of 1 L. The heat exchange fluid has an inlet temperature of −70° C. and a mass flow rate of 4 kg/s, and the heat transfer coefficient is 130 W/m²·K.

Figure 21:
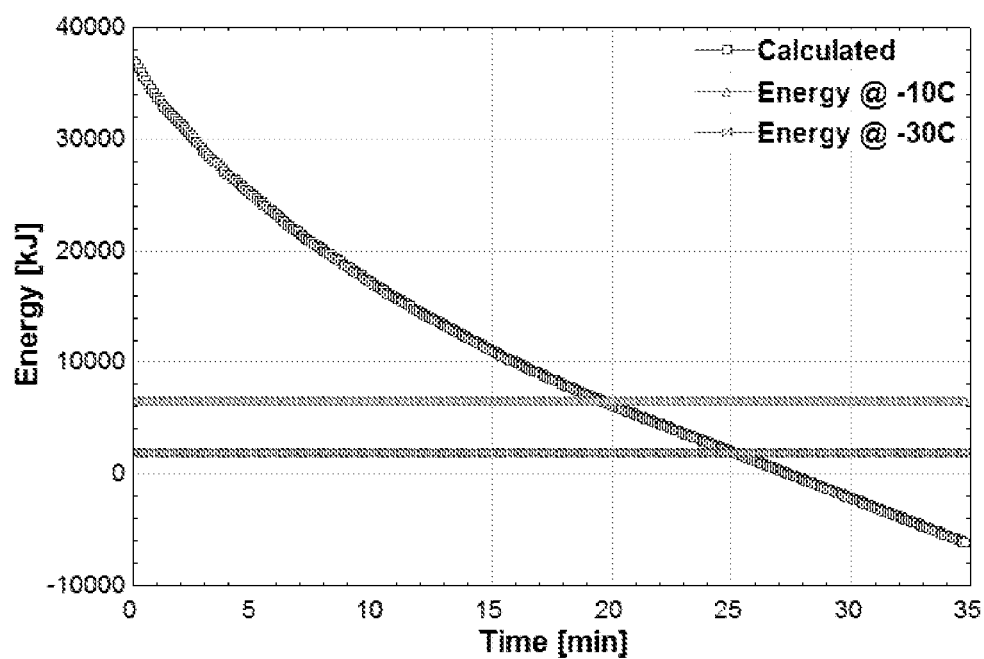
FIG. 21 is a graph showing energy levels over time for a second case of preserving milk.

FIG. 21 shows the calculated energy over time for investigated case #2, as compared against the energy level at which the average temperature of the product is at −10° C. and −30° C. respectively.

Figure 22:
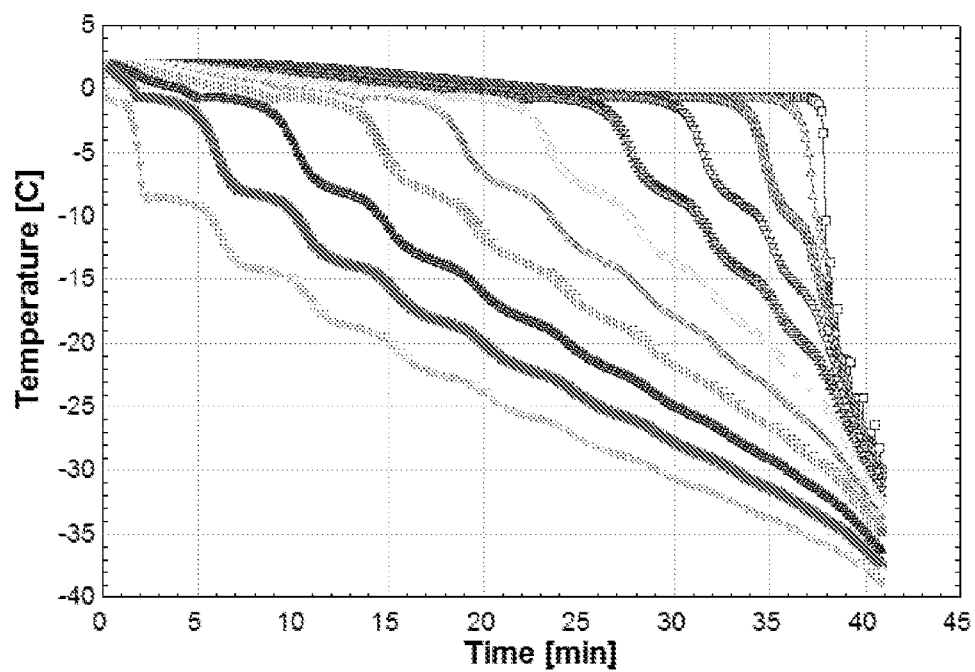
FIG. 22 is a graph showing temperature reduction over time at 11 equally distributed increments for a third case of preserving milk.

FIG. 22 shows the temperature profiles at equally distributed increments of case #3. In this case, the milk is contained in plastic bottles of 69 mm diameter, 1.5 mm thickness and 500 mL volume. The heat exchange fluid has an inlet temperature of −50° C. and a mass flow rate of 4 kg/s, and the heat transfer coefficient is 130 W/m²·K.

Figure 23:
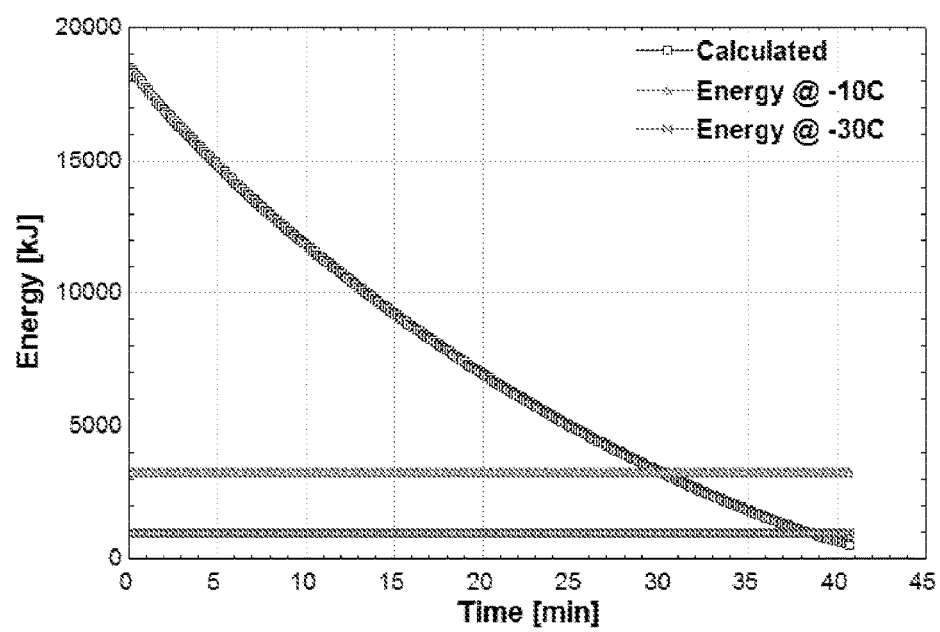
FIG. 23 is a graph showing energy levels over time for a third case of preserving milk.

FIG. 23 shows the calculated energy over time for investigated case #3, as compared against the energy level at which the average temperature of the product is at −10° C. and −30° C. respectively.

Figure 24:
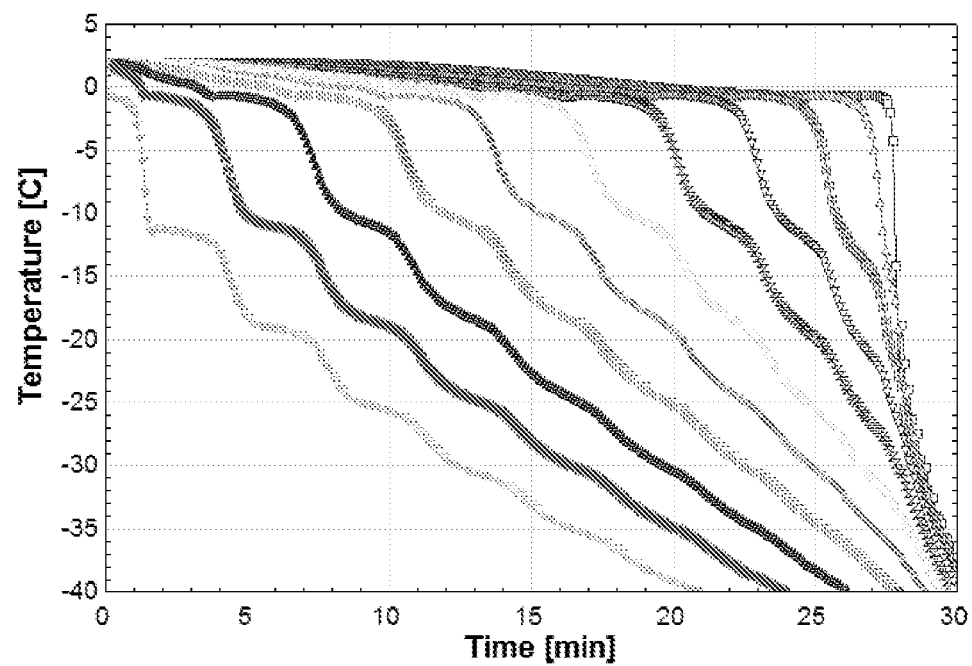
FIG. 24 is a graph showing temperature reduction over time at 11 equally distributed increments for a fourth case of preserving milk.

FIG. 24 shows the temperature profiles at equally distributed increments of case #4. In this case, the milk is contained in plastic bottles of 69 mm diameter, 1.5 mm plastic and 500 mL volume. The heat exchange fluid has an inlet temperature of −70° C. and a mass flow rate of 4 kg/s, and the heat transfer coefficient is 130 W/m²·K.

Figure 25:
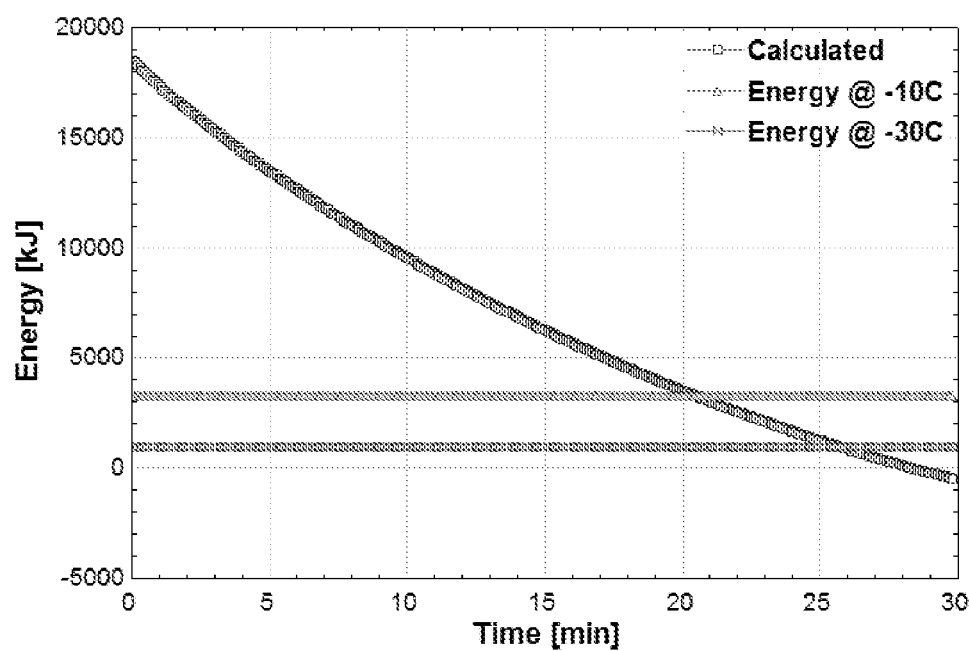
FIG. 25 is a graph showing energy levels over time for a fourth case of preserving milk.

FIG. 25 shows the calculated energy over time for investigated case #4, as compared against the energy level at which the average temperature of the product is at −10° C. and −30° C. respectively.

As shown by comparison of FIGS. 18, 20, 22 and 24, the freezing times between the 85 mm diameter bottles and the 69 mm bottles did not significantly vary. The 1.5 mm thickness plastic bottles have higher heat resistance than the 1 mm thickness glass bottles. The surface area of the 500 mL bottles is significantly smaller than that of the 1000 mL bottles.

Heat Transfer Analysis on Fish

TABLE 6

Results of computational fluid dynamics on meat and fish pieces

| Temperature of product surface [° C.] | Temperature of heat exchange fluid at inlet [° C.] | Total surface area of products [m2] | Rate of heat transferred from products [W] | Heat Transfer Coefficient [W/m2K] |
|---|---|---|---|---|
| 0 | −50 | 9.98 | 68839 | 138 |
| −20 | −50 | 9.98 | 38215 | 128 |
| −30 | −50 | 9.98 | 23673 | 119 |
| −40 | −50 | 9.98 | 10147 | 102 |

Figure 26:
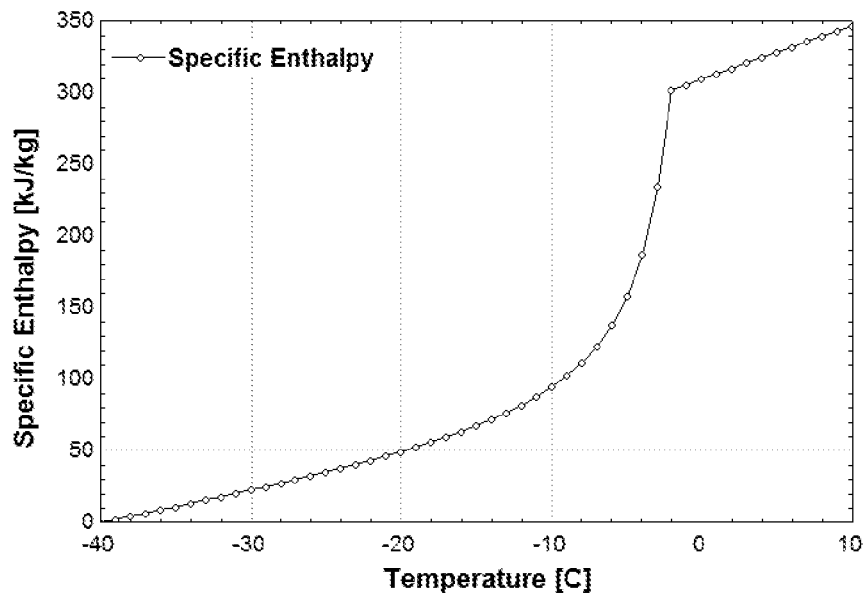
FIG. 26 is a graph showing the relationship of specific enthalpy with temperature for fish.
Figure 27:
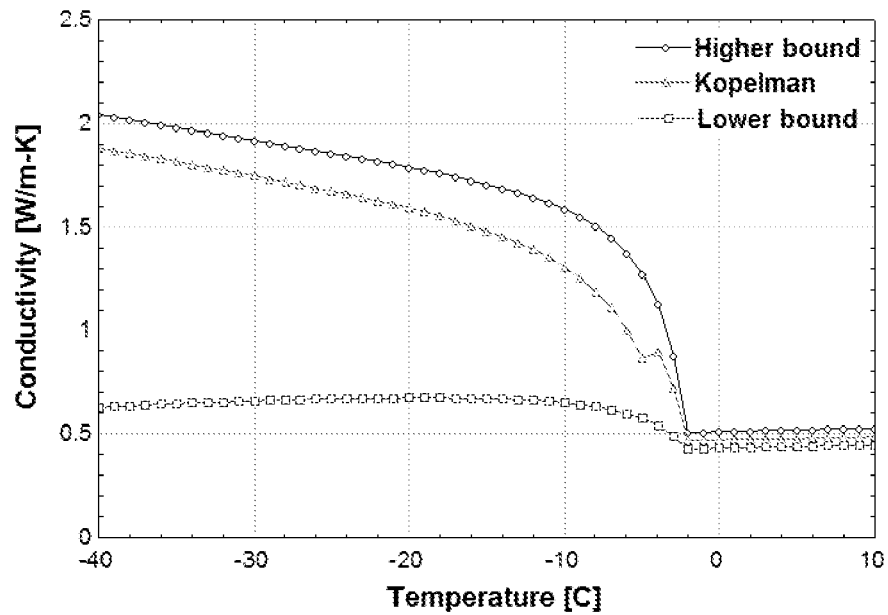
FIG. 27 is a graph showing conductivity of the fish product.

The starting temperature of fish was also assumed to be 2° C. The type of fish is assumed to be cod, the properties of which were obtained from the ASHRAE Engineering Handbook—Refrigeration, Thermal Properties of Foods. FIG. 26 shows the obtained specific enthalpy values for fish. FIG. 24 shows the conductivity values obtained for fish.

In view of the results obtained from the computational fluid dynamics analysis shown in Table 6, a conservative heat transfer coefficient was estimated as 100 W/m²·K, which was obtained by taking the lowest simulated heat transfer coefficient and rounding it down to the nearest ten.

The cases investigated for fish are given in the table below (Table 7).

TABLE 7

Investigated cases for different fish geometries and different heat exchange fluid inlet temperatures

| # | Product | Geometry | Outer Layer | Heat Exchange Fluid Temperature [° C.] | Heat Exchange Fluid Flow [kg/s] | HTC [W/m²-K] |
|---|---|---|---|---|---|---|
| 1 | Fish | 50 mm thick, 100 × 50 mm | 0.1 mm plastic | −50 | 4 | 100 |
| 2 | Fish | 50 mm thick, 100 × 50 mm | 0.1 mm plastic | −70 | 4 | 100 |
| 3 | Fish | 25 mm thick, 100 × 100 mm | 0.1 mm plastic | −50 | 4 | 100 |
| 4 | Fish | 25 mm thick, 100 × 100 mm | 0.1 mm plastic | −70 | 4 | 100 |

As shown above, the flow rate of heat exchange fluid and thus the heat transfer coefficient (HTC) remain the same for each of the above cases. The table below (Table 7) shows the freezing time results for the above investigated cases as predicted by simulation software.

TABLE 8

Freezing time results for fish

| # | Geometry | Heat Exchange Fluid Temperature [° C.] | Time for product average temperature to reach −30° C. [minutes] | Time for product core temperature to reach −30° C. [minutes] |
|---|---|---|---|---|
| 1 | 50 mm thick, 100 × 50 mm | −50 | 26.5 | 29.5 |
| 2 | 50 mm thick, 100 × 50 mm | −70 | 17.5 | 20 |
| 3 | 25 mm thick, 100 × 100 mm | −50 | 23 | 24 |
| 4 | 25 mm thick, 100 × 100 mm | −70 | 15 | 16 |

Figure 28:
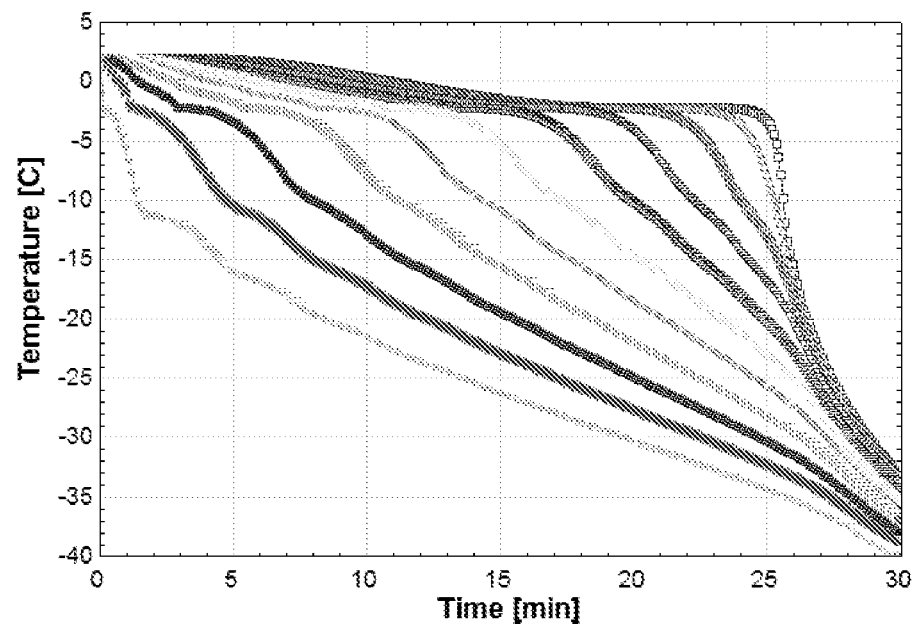
FIG. 28 is a graph showing temperature reduction over time at 11 equally distributed increments for a first case of preserving fish.

The temperature changes over time for eleven equally distributed increments from surface to core of the fish are calculated for each of the above cases. FIG. 28 shows the temperature profiles for case #1. In this case, the fish is 50 mm thick and has a length and width of 100 mm and 50 mm respectively. The fish is contained within 0.1 mm plastic. The heat exchange fluid has an inlet temperature of −50° C. and a mass flow rate of 4 kg/s, and the heat transfer coefficient is 100 W/m2·K.

Figure 29:
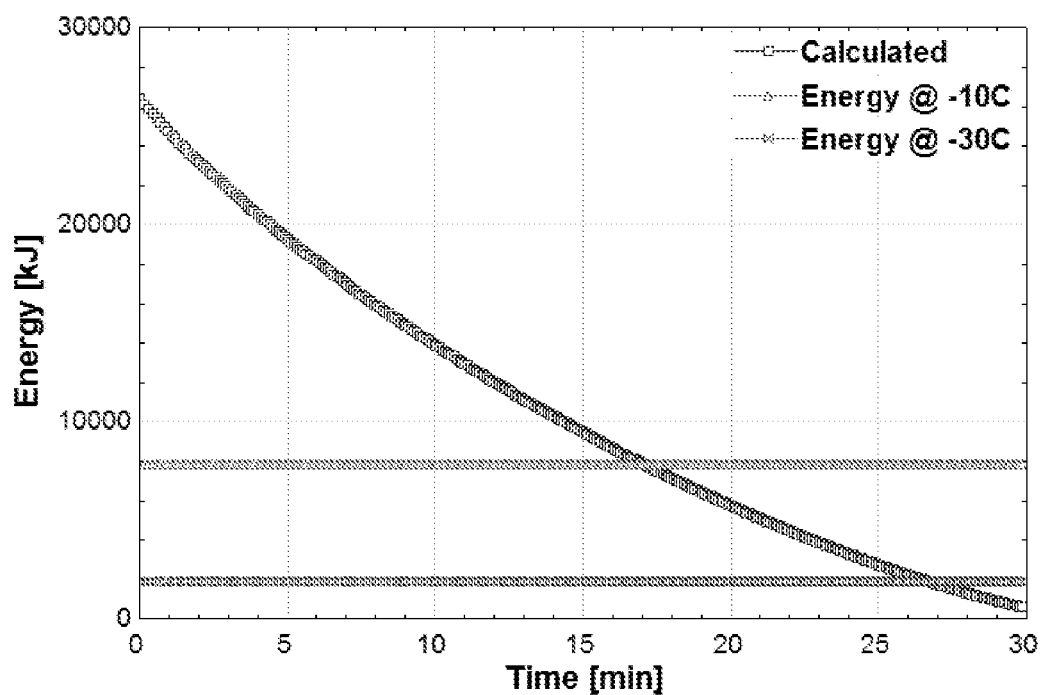
FIG. 29 is a graph showing energy levels over time for a first case of preserving fish.

FIG. 29 shows the calculated energy over time for investigated case #1, as compared against the energy level at which the average temperature of the product is at −10° C. and −30° C. respectively.

Figure 30:
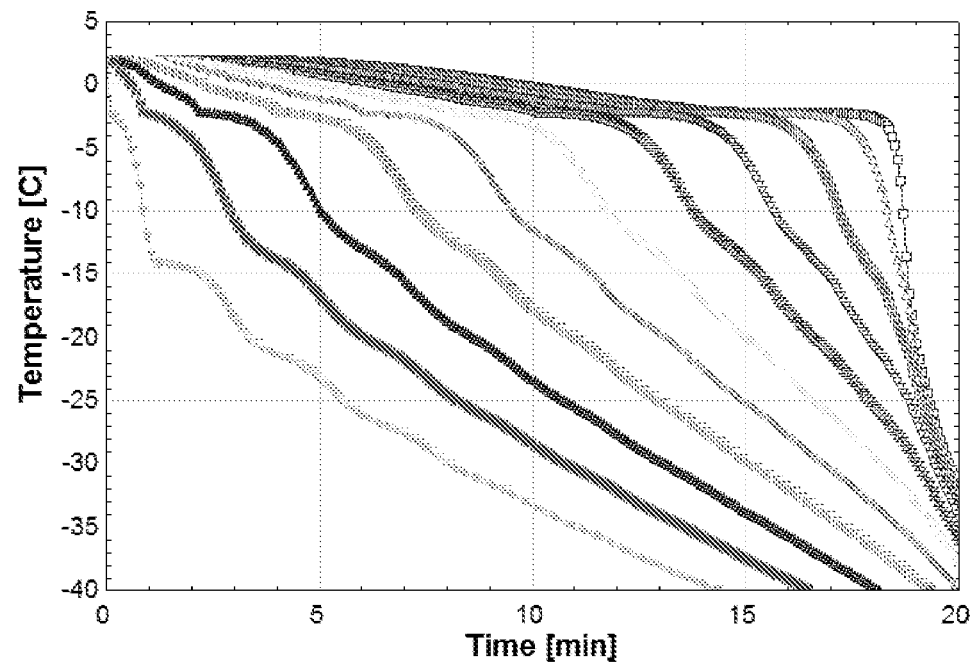
FIG. 30 is a graph showing temperature reduction over time at 11 equally distributed increments for a second case of preserving fish.

FIG. 30 shows the temperature profiles for case #2. In this case, the fish is 50 mm thick and has a length and width of 100 mm and 50 mm respectively. The fish is contained within 0.1 mm plastic. The heat exchange fluid has an inlet temperature of −70° C. and a mass flow rate of 4 kg/s, and the heat transfer coefficient is 100 W/m2·K.

Figure 31:
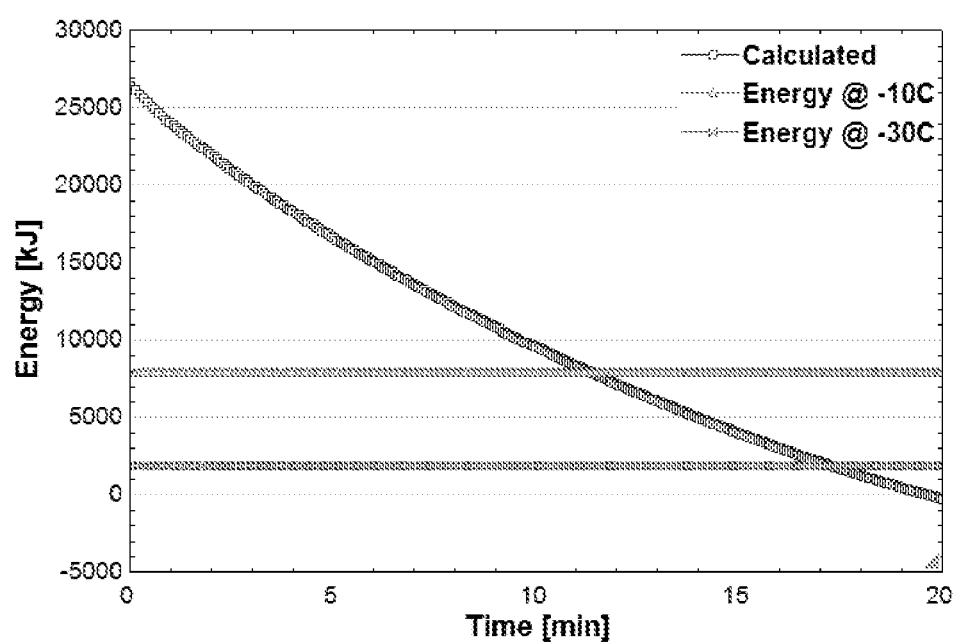
FIG. 31 is a graph showing energy levels over time for a second case of preserving fish.
Figure 32:
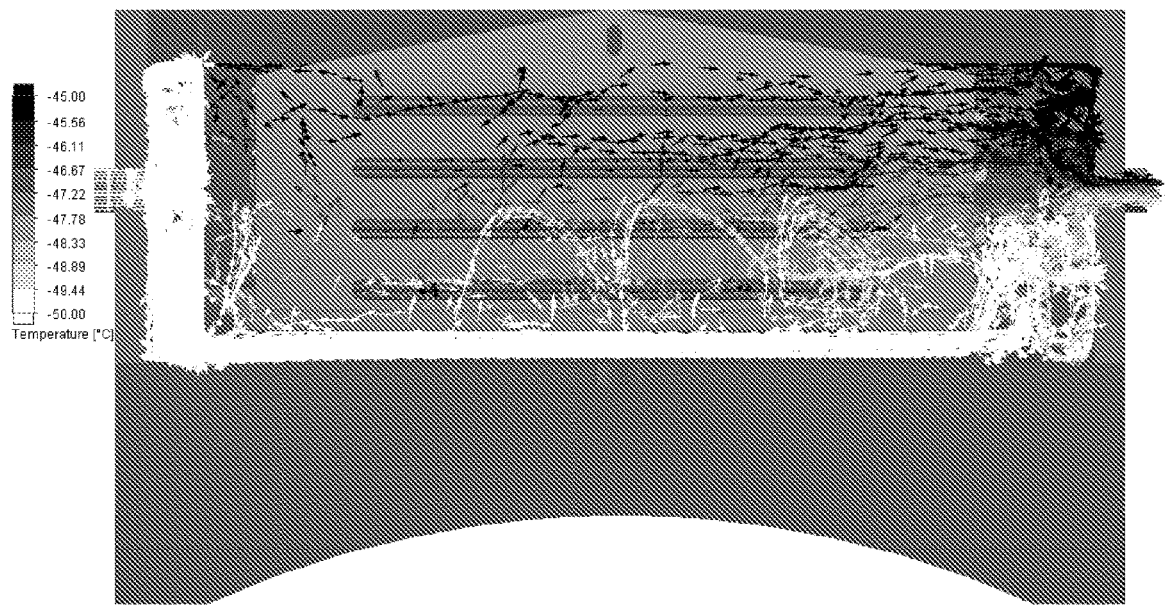
FIG. 32 is an image showing computational fluid dynamics analysis of temperature in a tank containing meat.
Figure 33:
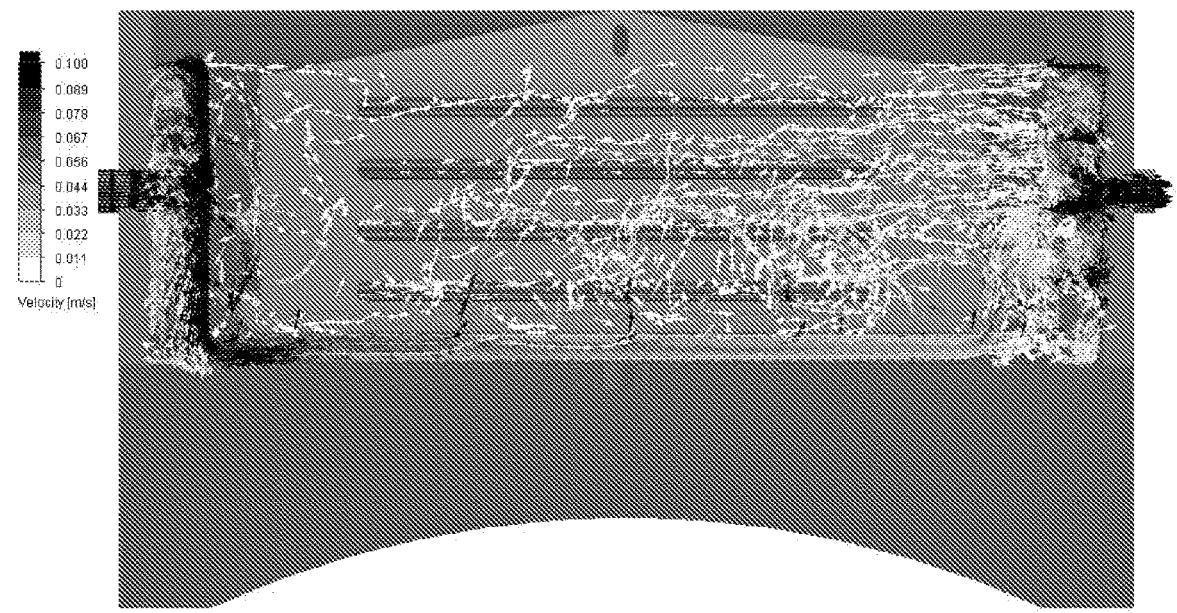
FIG. 33 is an image showing computational fluid dynamics analysis of velocity in the tank containing meat.
Figure 34:
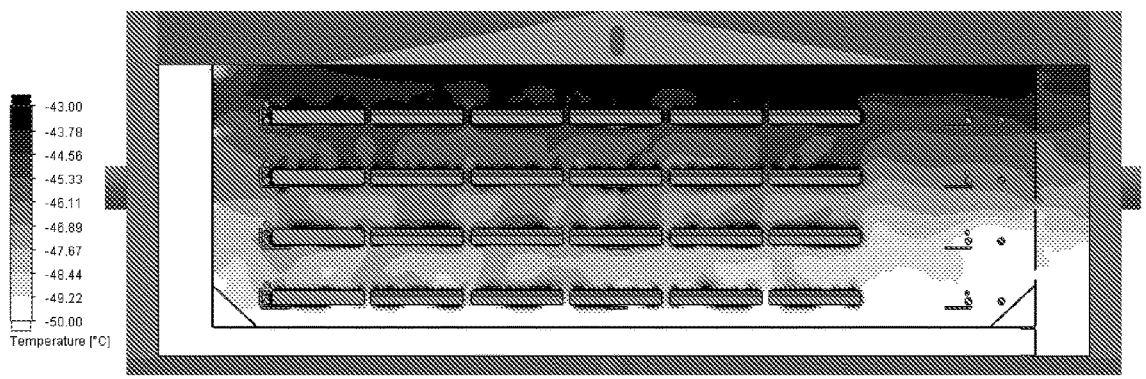
FIG. 34 is a cut plot through the tray of meat showing temperature distribution in the tank.
Figure 35:
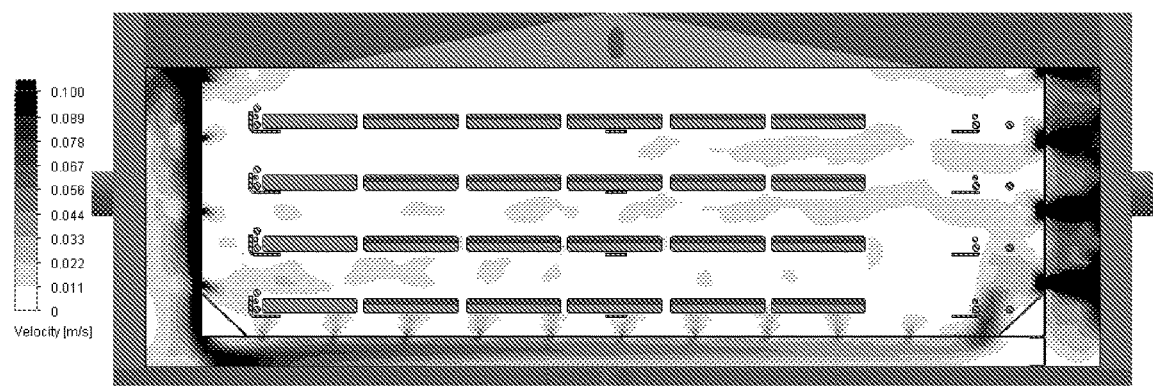
FIG. 35 is a cut plot through the tray of meat showing velocity distribution through the tank.

FIG. 31 shows the calculated energy over time for investigated case #2, as compared against the energy level at which the average temperature of the product is at −10° C. and −30° C. respectively.

Figure 36:
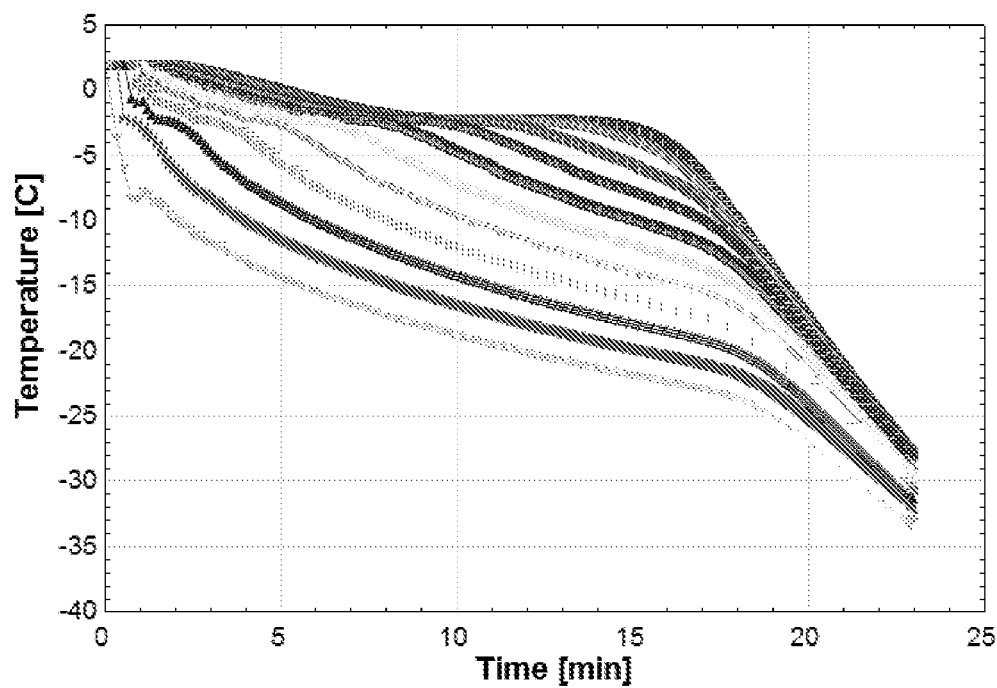
FIG. 36 is a graph showing temperature reduction over time at 11 equally distributed increments for a third case of preserving fish.

FIG. 36 shows the temperature profiles for case #3. In this case, the fish is 25 mm thick and has a length and width of 100 mm and 100 mm respectively. The fish is contained within 0.1 mm plastic. The heat exchange fluid has an inlet temperature of −50° C. and a mass flow rate of 4 kg/s, and the heat transfer coefficient is 100 W/m2·K.

Figure 37:
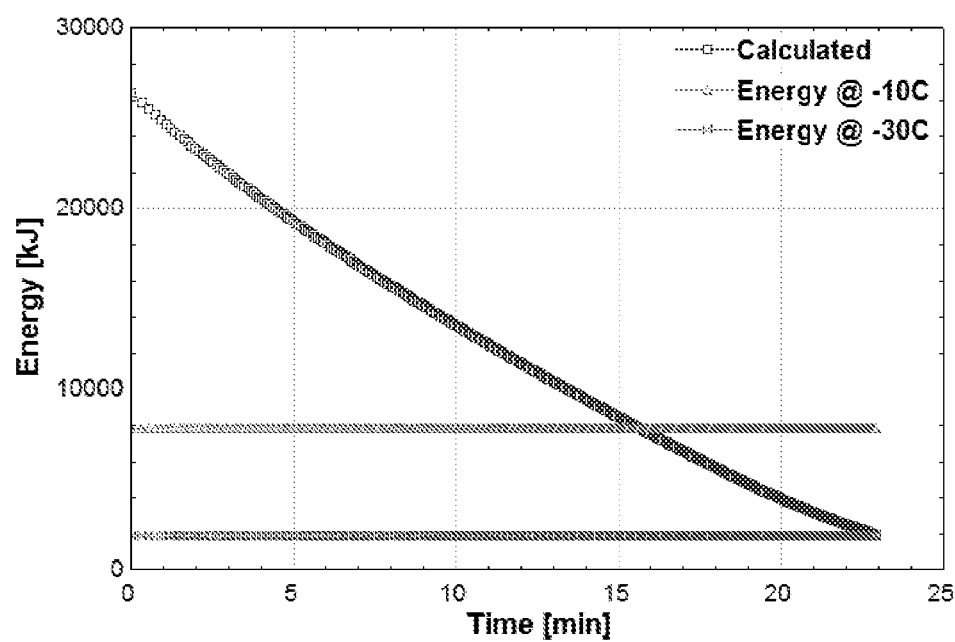
FIG. 37 is a graph showing energy levels over time for a third case of preserving fish.

FIG. 37 shows the calculated energy over time for investigated case #3, as compared against the energy level at which the average temperature of the product is at −10° C. and −30° C. respectively.

Figure 38:
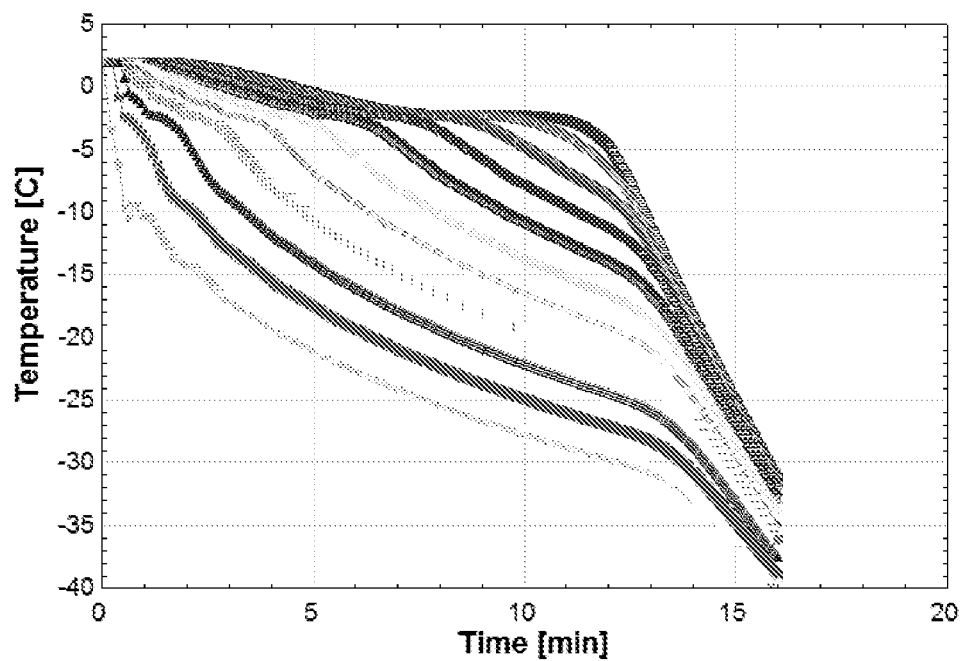
FIG. 38 is a graph showing temperature reduction over time at 11 equally distributed increments for a fourth case of preserving fish.

FIG. 38 shows the temperature profiles for case #4. In this case, the fish is 25 mm thick and has a length and width of 100 mm and 100 mm respectively. The fish is contained within 0.1 mm plastic. The heat exchange fluid has an inlet temperature of −70° C. and a mass flow rate of 4 kg/s, and the heat transfer coefficient is 100 W/m2·K.

Figure 39:
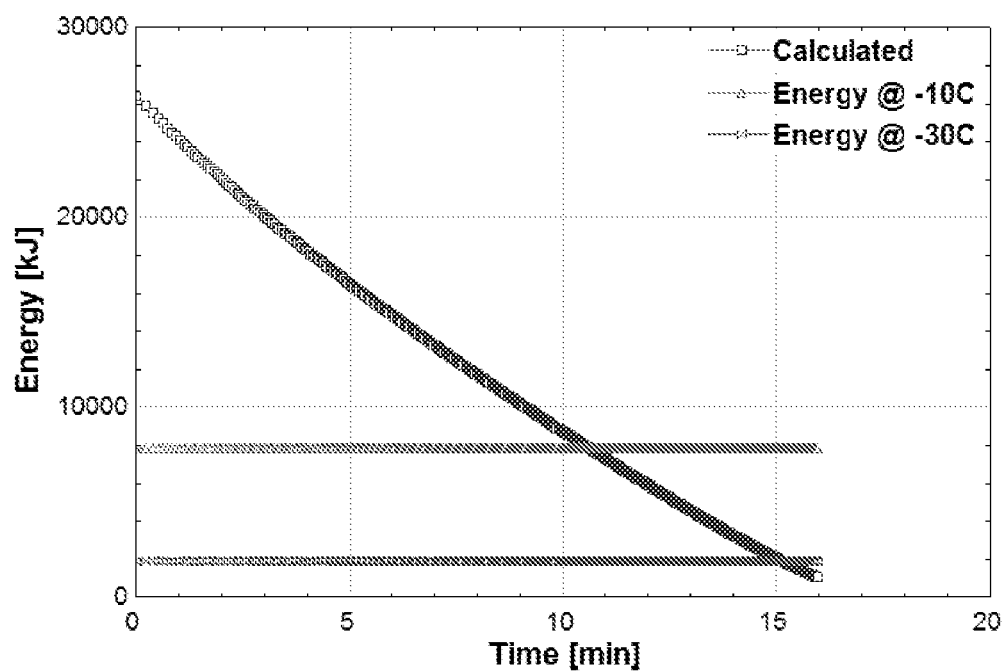
FIG. 39 is a graph showing energy levels over time for a fourth case of preserving fish.

FIG. 39 shows the calculated energy over time for investigated case #4, as compared against the energy level at which the average temperature of the product is at −10° C. and −30° C. respectively.

As can be seen from the above results, the thinner pieces of fish can be frozen more quickly than the thicker pieces of fish.

Heat Transfer Analysis on Meat

Figure 40:
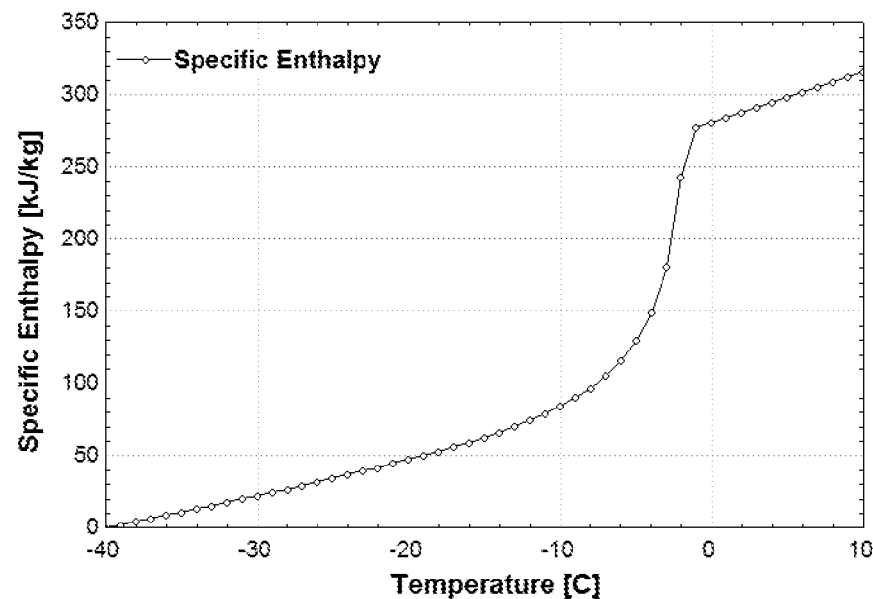
FIG. 40 is a graph showing the relationship of specific enthalpy with temperature for meat.
Figure 41:
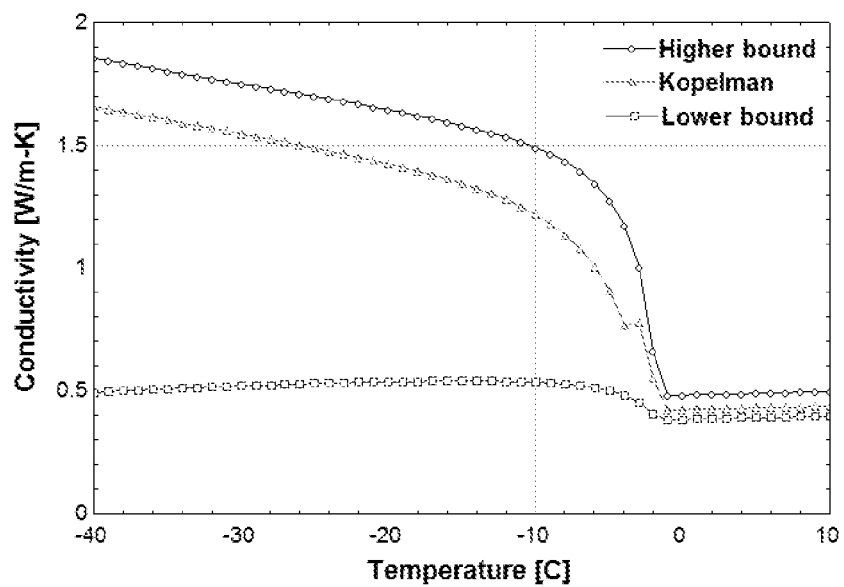
FIG. 41 is a graph showing conductivity of the meat product.

The starting temperature of meat was also assumed to be 2° C. The type of meat is assumed to be lean sirloin, the properties of which were obtained from the ASHRAE Engineering Handbook—Refrigeration, Thermal Properties of Foods. FIG. 40 shows the obtained specific enthalpy values for fish. FIG. 41 shows the conductivity values obtained for fish.

The cases investigated for meat are given in the table below (Table 9).

TABLE 9

Investigated cases for different meat geometries and different heat exchange fluid inlet temperatures

| # | Product | Geometry | Outer Layer | Heat Exchange Fluid Temperature [° C.] | Heat Exchange Fluid Flow [kg/s] | HTC [W/m²-K] |
|---|---------|----------|-------------|----------------------------------------|----------------------------------|--------------|
| 1 | Meat | 50 mm thick, 100 × 50 mm | 0.1 mm plastic | −50 | 4 | 100 |
| 2 | Meat | 50 mm thick, 100 × 50 mm | 0.1 mm plastic | −70 | 4 | 100 |
| 3 | Meat | 25 mm thick, 100 × 100 mm | 0.1 mm plastic | −50 | 4 | 100 |
| 4 | Meat | 25 mm thick, 100 × 100 mm | 0.1 mm plastic | −70 | 4 | 100 |

As shown above, the flow rate of heat exchange fluid and thus the heat transfer coefficient (HTC) remain the same for each of the above cases. The table below (Table 10) shows the freezing time results for the above investigated cases as predicted by simulation software.

TABLE 10

Freezing time results for meat

| # | Geometry | Heat Exchange Fluid Temperature [° C.] | Time for product average temperature to reach −30° C. [minutes] | Time for product core temperature to reach −30° C. [minutes] |
|---|----------|----------------------------------------|------------------------------------------------------------------|---------------------------------------------------------------|
| 1 | 50 mm thick, 100 × 50 mm | −50 | 25.5 | 28 |
| 2 | 50 mm thick, 100 × 50 mm | −70 | 16.5 | 19.5 |
| 3 | 25 mm thick, 100 × 100 mm | −50 | 22 | 22.5 |
| 4 | 25 mm thick, 100 × 100 mm | −70 | 14.5 | 15 |

Figure 42:
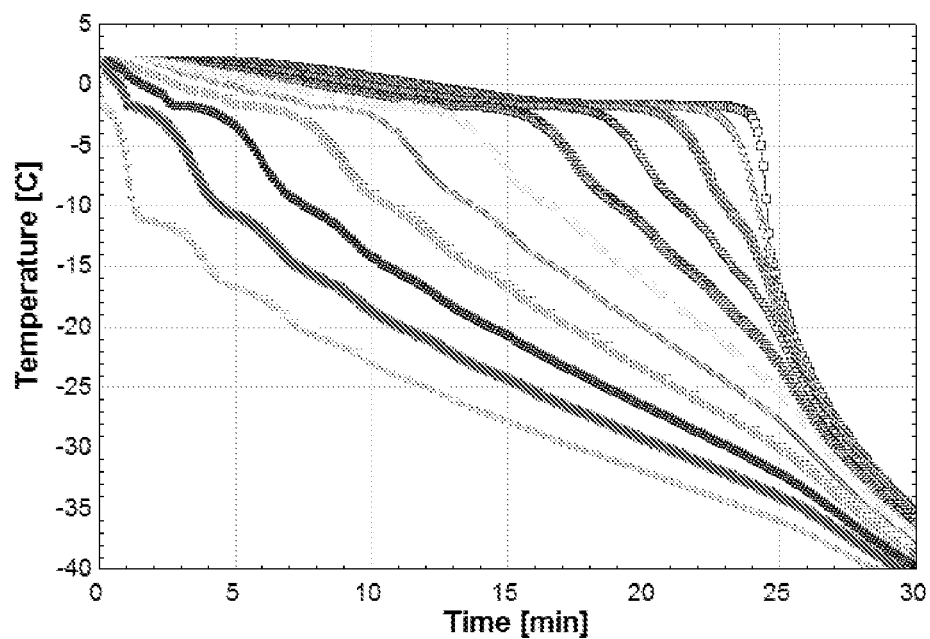
FIG. 42 is a graph showing temperature reduction over time at 11 equally distributed increments for a first case of preserving meat.

The temperature changes over time for eleven equally distributed increments from surface to core of the meat are calculated for each of the above cases. FIG. 42 shows the temperature profiles for case #1. In this case, the meat is 50 mm thick and has a length and width of 100 mm and 50 mm respectively. The meat is contained within 0.1 mm plastic. The heat exchange fluid has an inlet temperature of −50° C. and a mass flow rate of 4 kg/s, and the heat transfer coefficient is 100 W/m2·K.

Figure 43:
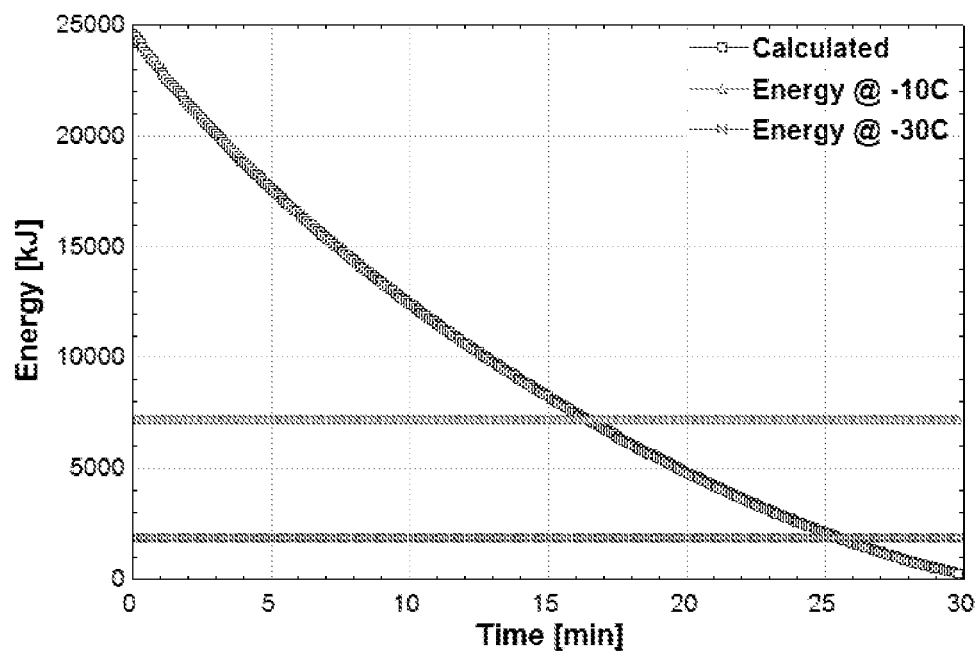
FIG. 43 is a graph showing energy levels over time for a first case of preserving meat.

FIG. 43 shows the calculated energy over time for investigated case #1, as compared against the energy level at which the average temperature of the product is at −10° C. and −30° C. respectively.

Figure 44:
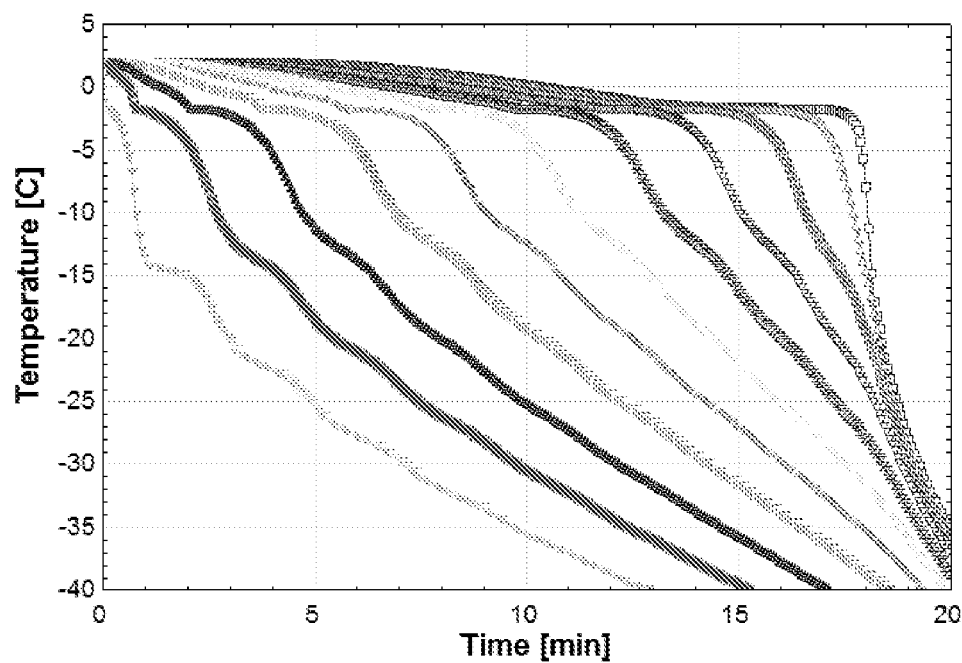
FIG. 44 is a graph showing temperature reduction over time at 11 equally distributed increments for a second case of preserving meat.

FIG. 44 shows the temperature profiles for case #2. In this case, the meat is 50 mm thick and has a length and width of 100 mm and 50 mm respectively. The meat is contained within 0.1 mm plastic. The heat exchange fluid has an inlet temperature of −70° C. and a mass flow rate of 4 kg/s, and the heat transfer coefficient is 100 W/m2·K.

Figure 45:
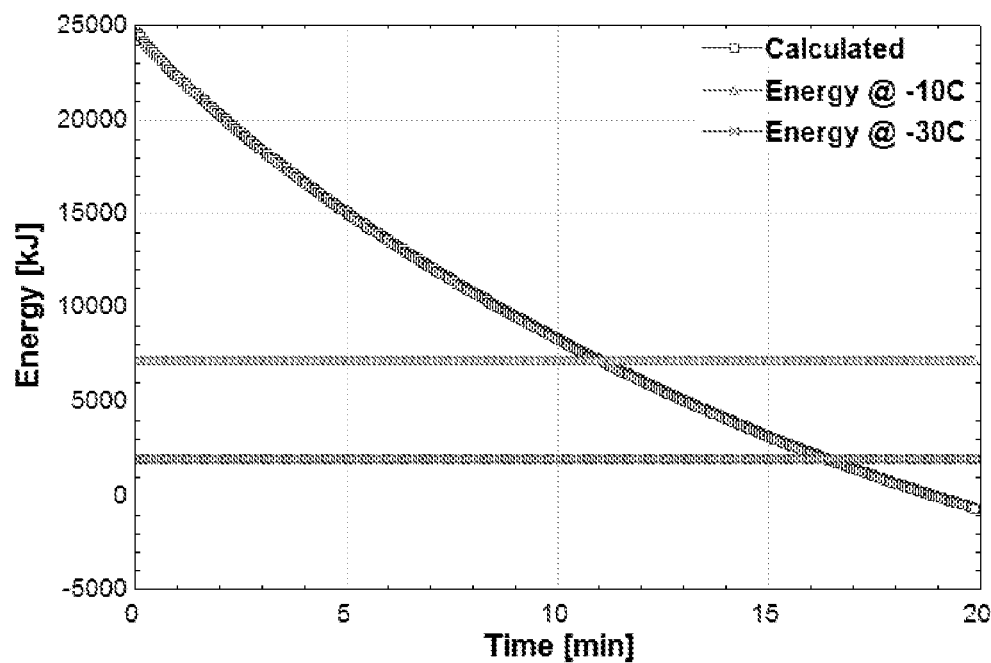
FIG. 45 is a graph showing energy levels over time for a second case of preserving meat.

FIG. 45 shows the calculated energy over time for investigated case #2, as compared against the energy level at which the average temperature of the product is at −10° C. and −30° C. respectively.

Figure 46:
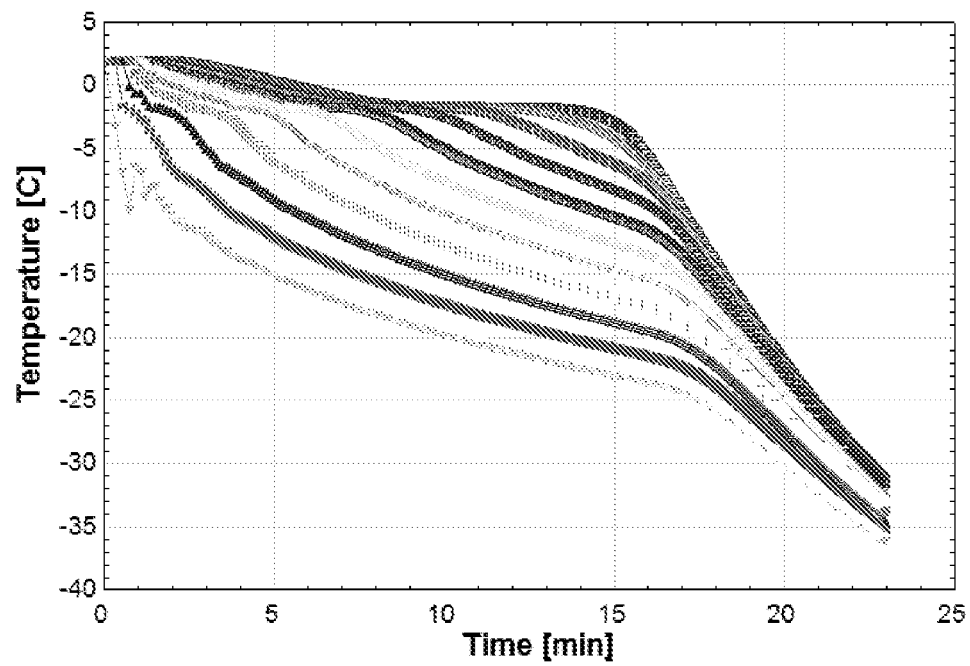
FIG. 46 is a graph showing temperature reduction over time at 11 equally distributed increments for a third case of preserving meat.

FIG. 46 shows the temperature profiles for case #3. In this case, the meat is 25 mm thick and has a length and width of 100 mm and 100 mm respectively. The meat is contained within 0.1 mm plastic. The heat exchange fluid has an inlet temperature of −50° C. and a mass flow rate of 4 kg/s, and the heat transfer coefficient is 100 W/m2·K.

Figure 47:
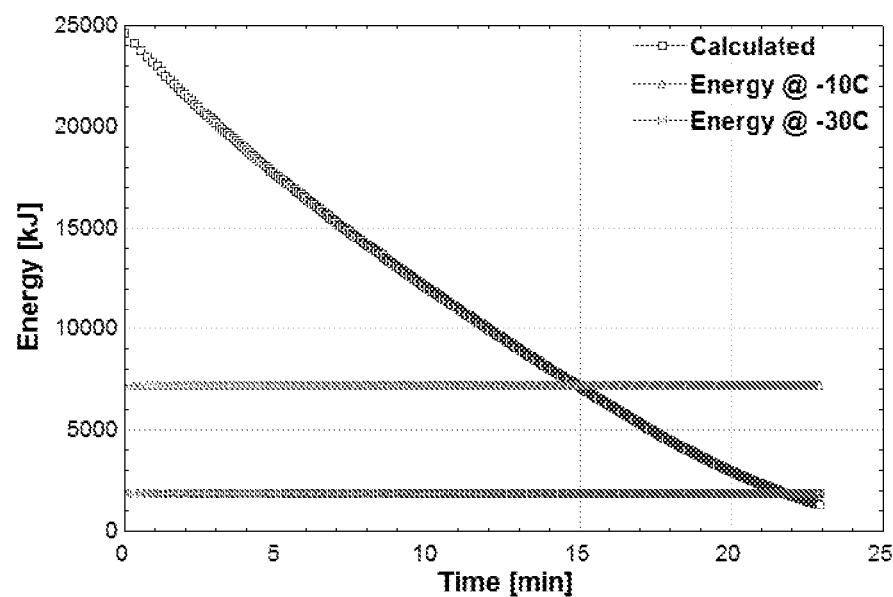
FIG. 47 is a graph showing energy levels over time for a third case of preserving meat.

FIG. 47 shows the calculated energy over time for investigated case #3, as compared against the energy level at which the average temperature of the product is at −10° C. and −30° C. respectively.

Figure 48:
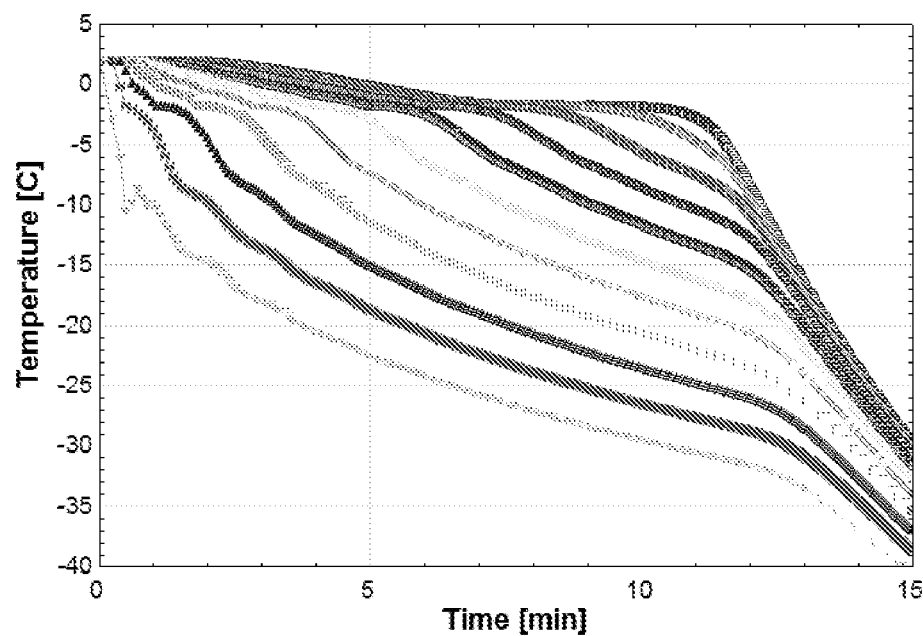
FIG. 48 is a graph showing temperature reduction over time at 11 equally distributed increments for a fourth case of preserving meat.

FIG. 48 shows the temperature profiles for case #4. In this case, the meat is 25 mm thick and has a length and width of 100 mm and 100 mm respectively. The meat is contained within 0.1 mm plastic. The heat exchange fluid has an inlet temperature of −70° C. and a mass flow rate of 4 kg/s, and the heat transfer coefficient is 100 W/m2·K.

Figure 49:
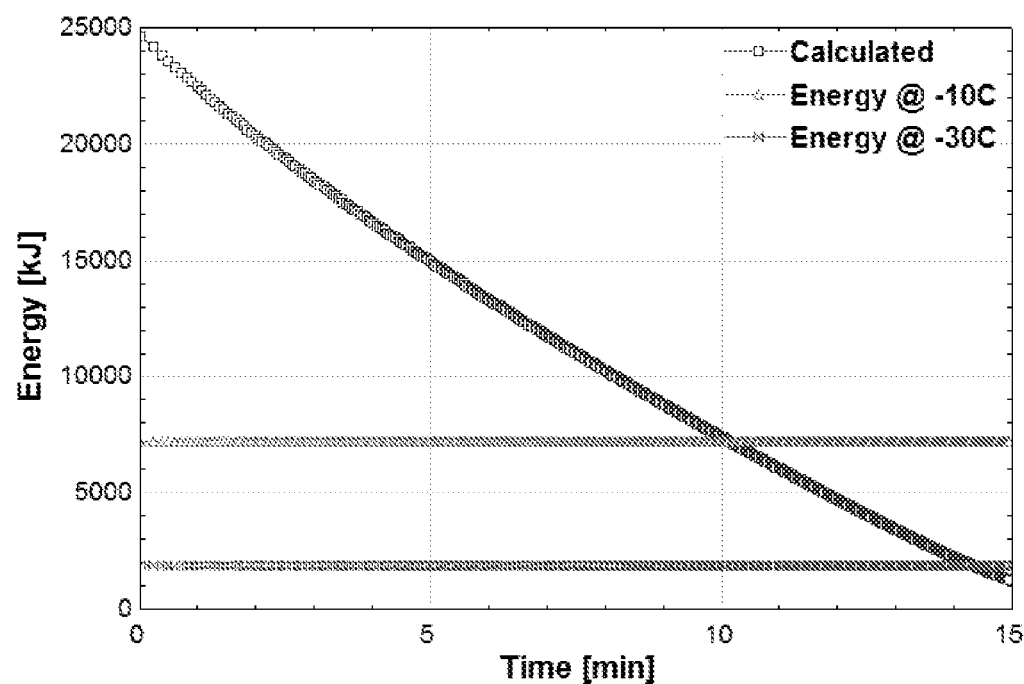
FIG. 49 is a graph showing energy levels over time for a fourth case of preserving meat.

FIG. 49 shows the calculated energy over time for investigated case #4, as compared against the energy level at which the average temperature of the product is at −10° C. and −30° C. respectively.

As can be seen from the above results, the thinner pieces of meat can be frozen more quickly than the thicker pieces of meat.

In the preferred embodiments of the present invention, the consumable products are contained in packaging or within the basket or tray structures used for immersion in the tanks. Advantageously, this prevents sublimation of the product during the preserving process, which is a problem with existing immersion preservation methods that do not use packaging due to issues with cracking.

Advantageously, using the above analyses, the system can be used to reduce the temperature of the food product to a target temperature (e.g., −50° C.) within a desired amount of time (e.g. 30 minutes) at a desired flow rate (e.g. 4 kg/s). Input parameters of the apparatus are set based on the findings of the analyses. This allows a user to simply select the product (e.g., "fish fillet") when using the system. Preferably, thin packaging is used with minimal air spaces, such as vacuum sealing or heat shrink wrapping.

While a theoretical freezing rate of 10° C. per minute or 100° C. per minute may result in even greater elimination results for the microbe levels in the consumable product, as well as less cellular damage, such rates are not viable for a commercial freezing system. Moreover, surprisingly it has been found that significant levels of microbe reduction can be achieved at a slower cooling rate, such as a rate of about 1° C. per minute, while retaining a high degree of sensory qualities and preventing damage to packaging.

Although heat transfer analysis in the abovementioned examples was performed on 11 volume increments of each consumable food product, it will be appreciated that this number can be varied.

The table below provides results for milk preserved over a cooling period of 45 minutes to a temperature of −30° C. immersed in heat exchange fluid at −50° C. The results have been described as similar to those of the pasteurisation process.

TABLE 11

Analysis Results of preserved raw milk

| Sample Description: | Analysis Results | | |
|---|---|---|---|
| | Test | Result | Unit |
| Raw Milk | Total Viable Count | 380 | cfu/g |
| | E. coli | <10 | cfu/g |
| | Coliform | <10 | cfu/g |
| | Listeria spp. | Not Detected | in 25 g |
| | Salmonella spp. | Not Detected | in 25 g |
| | Coagulase + ve Staphylococcus | <100 | cfu/g |
| | Yeast | <10 | cfu/g |
| | Mould | <10 | cfu/g |

Refrigeration System

Figure 50:
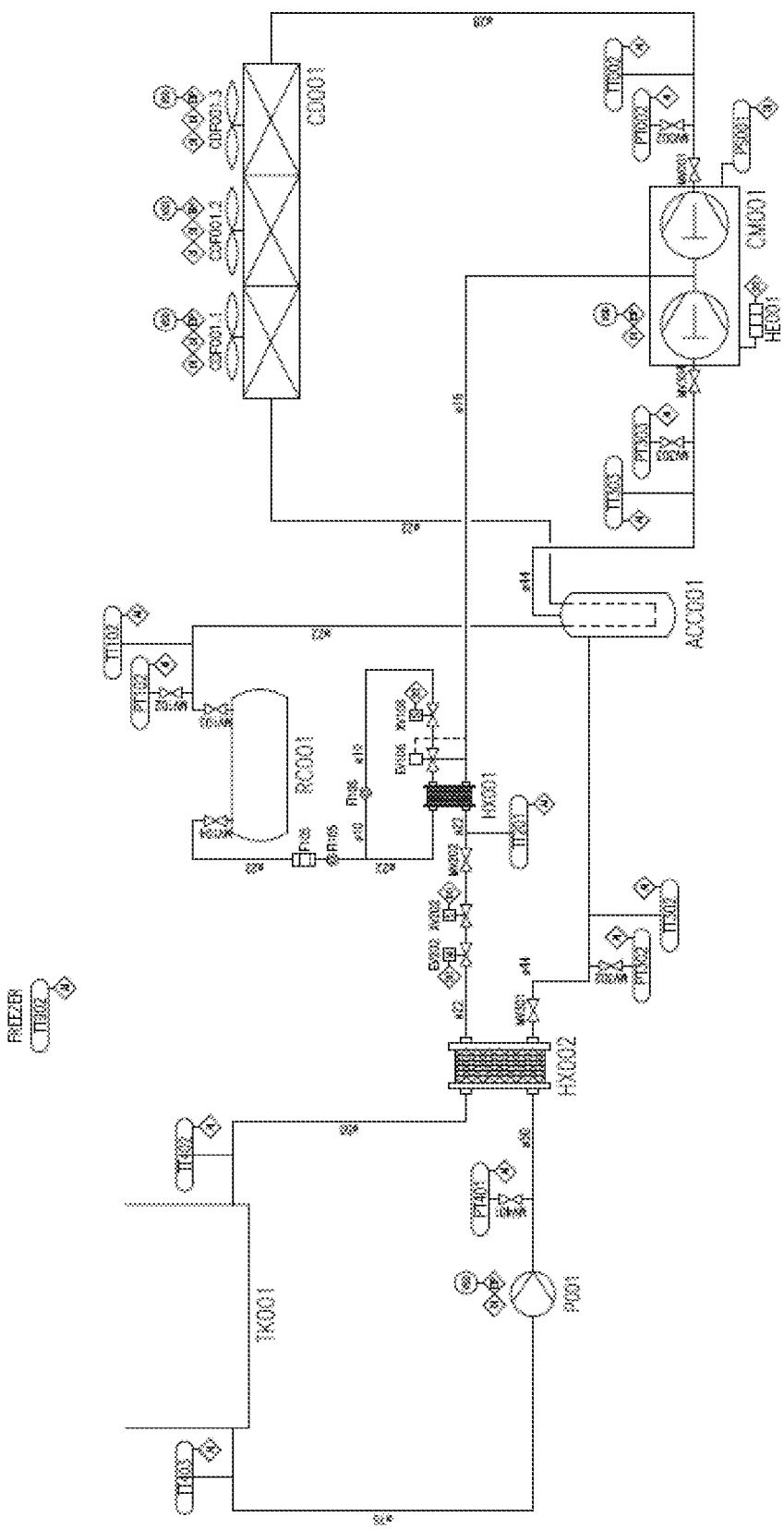
FIG. 50 is a piping and instrumentation diagram of the refrigeration system.

FIG. 50 is a piping and instrumentation diagram of the refrigeration system that continuously cools the heat exchange fluid.

The refrigeration system includes a heat exchanger for exchanging heat between the heat transfer fluid and the refrigerant, which can be R404A.

The claims defining the invention are as follows:

1. An apparatus for preserving consumable products by freezing the consumable products, the apparatus comprising an inner housing arranged within an outer insulated housing with a void space separation between the inner housing and the outer insulated housing,
    wherein walls of the inner housing define a compartment for receiving consumable products, said walls comprising:
        an inlet wall for inflow of a heat exchange fluid into the compartment;
        an opposed outlet wall for outflow of the heat exchange fluid out of the compartment;
        side walls; and
        a base, the side walls and base adjoining the inlet wall to the outlet wall,
    wherein the outer insulated housing comprises:
        an inlet side corresponding to the inlet wall of the inner housing and defining an inlet space between the inlet side and the inlet wall; and
        an outlet side corresponding to the outlet wall of the inner housing and defining an outlet space between the outlet side and the outlet wall, and
    wherein the inlet wall and outlet wall each include a series of apertures to accommodate a continuous heat exchange fluid flow through the apparatus such that, in operation, consumable products received in the compartment of the inner housing are immersed in the heat exchange fluid to exchange heat with the heat exchange fluid,
    wherein the inlet side includes at least one inlet communicating from an outside of the outer insulted housing into the inlet space,
    wherein the outlet side includes at least one outlet communicating from the outlet space to the outside of the outer insulated housing,
    wherein the apparatus further comprises a pump for pumping heat exchange fluid into the inlet space through the at least one inlet, and
    wherein, in operation, the heat exchange fluid is introduced into the apparatus via the at least one inlet and removed from the apparatus via the at least one outlet.

2. The apparatus of claim 1, wherein the base includes a series of apertures.

3. The apparatus of claim 1, the apparatus including a structure receivable in the compartment for holding the consumable products, wherein the structure is one or more of a tray, a rack and a basket.

4. The apparatus of claim 3, wherein the structure is suspended from a lid of the apparatus.

5. The apparatus of claim 1, wherein the inlet space and the outlet space are fluidly connected.

6. The apparatus of claim 1, wherein the at least one inlet and the at least one outlet are 80 mm in diameter.

7. The apparatus of claim 1, wherein, in use, the apparatus is configured to be connected to an external refrigeration system whereby, in operation, the heat exchange fluid exchanges heat with a refrigerant.

8. A method of preserving consumable products by freezing the consumable products using the apparatus of claim 1, wherein the heat exchange fluid is continuously cooled by heat exchange with a refrigerant in a refrigeration cycle external to the apparatus.

9. A method of preserving consumable products by freezing the consumable products in the preservation apparatus using a heat exchange fluid, the method comprising:
    a. determining a total surface area of an approximated geometry of the consumable products to be frozen;
    b. performing computational fluid dynamics analysis on the consumable products within the preservation apparatus based on flow constraints due both to a compartment geometry and predetermined arrangement of food consumable products in the compartment and a predetermined increase in temperature of the heat exchange fluid;
    c. determining heat transfer coefficients between the heat exchange fluid and the consumable products at predetermined product surface temperatures;

d. selecting a heat transfer coefficient by rounding down the lowest heat transfer coefficient determined at step (c) to the nearest ten;
e. dividing the approximated geometry of the consumable products into a predetermined number of equally distributed volume increments;
f. estimating thermal properties of the consumable products;
g. calculating, based on conservation of energy analysis using the heat transfer coefficient determined at step (d), a time required for each increment to reach a predetermined final temperature from a predetermined initial temperature for a predetermined heat exchange fluid temperature and a predetermined flow rate of the heat exchange fluid;
h. determining an achievable average rate of cooling based on the time calculated at step (g);
i. in response to the determined achievable average rate of cooling being 0.5° C. per minute or more, selecting said predetermined heat exchange fluid temperature, and in response to the determined achievable average rate of cooling being less than 0.5° C. per minute, selecting a heat exchange fluid temperature sufficiently less than the predetermined heat exchange fluid temperature such that the rate of cooling achievable is at least 0.5° C. per minute;
j. arranging the consumable products in the apparatus for preservation; and
k. subjecting the consumable products to cooling using the temperature determined at step (i) and cooling the consumable products at a rate of at least 0.5° C. per minute.

10. The method of claim 9, wherein the predetermined flow rate is about 4 kg/s.

11. The method of claim 9, wherein the predetermined final temperature is one of:
   a. −10° C.; and
   b. −30° C.

12. The method of claim 9, wherein the properties of the consumable products include at least one of:
   a. specific enthalpy;
   b. water content;
   c. fat content; and
   d. protein content.

13. The method of claim 9, wherein the time is less than 30 minutes.

14. The method of claim 9, wherein the heat transfer coefficient is one of:
   a. 130 W/m²·K; and
   b. 100 W/m²·K.

15. The method of claim 9, wherein an inlet temperature of the heat exchange fluid is −50° C. and an outlet temperature of the heat exchange fluid is −47° C.

16. The method of claim 9, wherein the determined average rate of cooling is between 0.5° C. per minute and 1.5° C. per minute, and comprising cooling the products at a rate of between 0.5° C. per minute and 1.5° C. per minute.

17. The method of claim 9, wherein the determined average rate of cooling is approximately 1° C. per minute, and comprising cooling the products at a rate of approximately 1° C. per minute.

18. The method of claim 9, wherein the method produces a preserved consumable product such that a quality of at least one of taste, texture and nutrition is retained.

19. The method of claim 9, wherein the preservation apparatus is the apparatus of claim 1.

* * * * *